(12) United States Patent
Oda

(10) Patent No.: US 8,554,017 B2
(45) Date of Patent: Oct. 8, 2013

(54) IMAGING APPARATUS, DATA PROCESSING METHOD, AND PROGRAM

(75) Inventor: Ryunosuke Oda, Tokyo (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/926,552

(22) Filed: Nov. 24, 2010

(65) Prior Publication Data

US 2011/0158556 A1 Jun. 30, 2011

(30) Foreign Application Priority Data

Dec. 4, 2009 (JP) ................. P2009-276450

(51) Int. Cl.
| | |
|---|---|
| G06K 9/36 | (2006.01) |
| G06K 9/32 | (2006.01) |
| G01C 9/00 | (2006.01) |
| G01C 17/00 | (2006.01) |
| G01C 19/00 | (2013.01) |
| G09G 5/00 | (2006.01) |
| H04N 9/74 | (2006.01) |

(52) U.S. Cl.
USPC ........... 382/296; 382/286; 382/289; 382/276; 382/295; 702/150; 345/648; 345/656; 348/583

(58) Field of Classification Search
USPC .......................................................... 382/286
See application file for complete search history.

(56) References Cited

U.S. PATENT DOCUMENTS

| | | | | |
|---|---|---|---|---|
| 4,866,784 | A * | 9/1989 | Barski .......................... | 382/289 |
| 6,674,892 | B1 * | 1/2004 | Melen .......................... | 382/154 |
| 6,834,250 | B2 * | 12/2004 | Uchiyama et al. ............ | 702/150 |
| 6,993,450 | B2 * | 1/2006 | Takemoto et al. ............ | 702/153 |
| 7,113,632 | B2 * | 9/2006 | Lee et al. ...................... | 382/154 |
| 7,295,216 | B2 * | 11/2007 | Matsumoto et al. ......... | 345/620 |
| 7,295,218 | B2 * | 11/2007 | Matsumoto et al. ......... | 345/620 |
| 7,304,650 | B2 * | 12/2007 | Matsumoto et al. ......... | 345/620 |
| 7,349,583 | B2 * | 3/2008 | Kumar et al. ................. | 382/294 |
| 7,424,174 | B2 * | 9/2008 | Furuhashi et al. ............ | 382/291 |
| 8,401,815 | B2 * | 3/2013 | Dohta ........................... | 702/150 |
| 8,423,559 | B2 * | 4/2013 | Matsushita et al. .......... | 707/752 |
| 2001/0010546 | A1 * | 8/2001 | Chen ............................ | 348/218 |
| 2002/0044690 | A1 * | 4/2002 | Burgess ....................... | 382/209 |
| 2004/0169734 | A1 * | 9/2004 | Umeyama .................. | 348/218.1 |
| 2005/0190273 | A1 * | 9/2005 | Toyama et al. ............. | 348/231.5 |
| 2006/0125920 | A1 * | 6/2006 | Criminisi et al. ............ | 348/159 |

(Continued)

FOREIGN PATENT DOCUMENTS

| | | |
|---|---|---|
| JP | 2005-026859 | 1/2005 |
| JP | 2005-110031 | 4/2005 |

*Primary Examiner* — Michelle Entezari

(74) *Attorney, Agent, or Firm* — Rader, Fishman & Grauer PLLC

(57) ABSTRACT

An imaging apparatus includes: an orientation sensor that detects orientation representing the direction in which the imaging apparatus is oriented; a controller that produces data formed of a captured image and attribute information associated with the captured image and records the data in a recording section; and the recording section that stores a captured image and attribute information, wherein the controller successively records an entry in a memory, the entry relating orientation information calculated by successively receiving a value detected with the orientation sensor to a time stamp representing the time at which the detected value is inputted from the orientation sensor, extracts a plurality of entries having time stamps close to the time at which the image was captured from the entries recorded in the memory, and calculates orientation information representing the direction in which the image was captured by using the plurality of pieces of orientation information in the extracted entries.

7 Claims, 14 Drawing Sheets

(56) References Cited

U.S. PATENT DOCUMENTS

| | | | |
|---|---|---|---|
| 2006/0195475 A1* | 8/2006 | Logan et al. | 707/104.1 |
| 2008/0317379 A1* | 12/2008 | Steinberg et al. | 382/275 |
| 2009/0086022 A1* | 4/2009 | Finn et al. | 348/143 |
| 2010/0208244 A1* | 8/2010 | Earhart et al. | 356/139.01 |

* cited by examiner

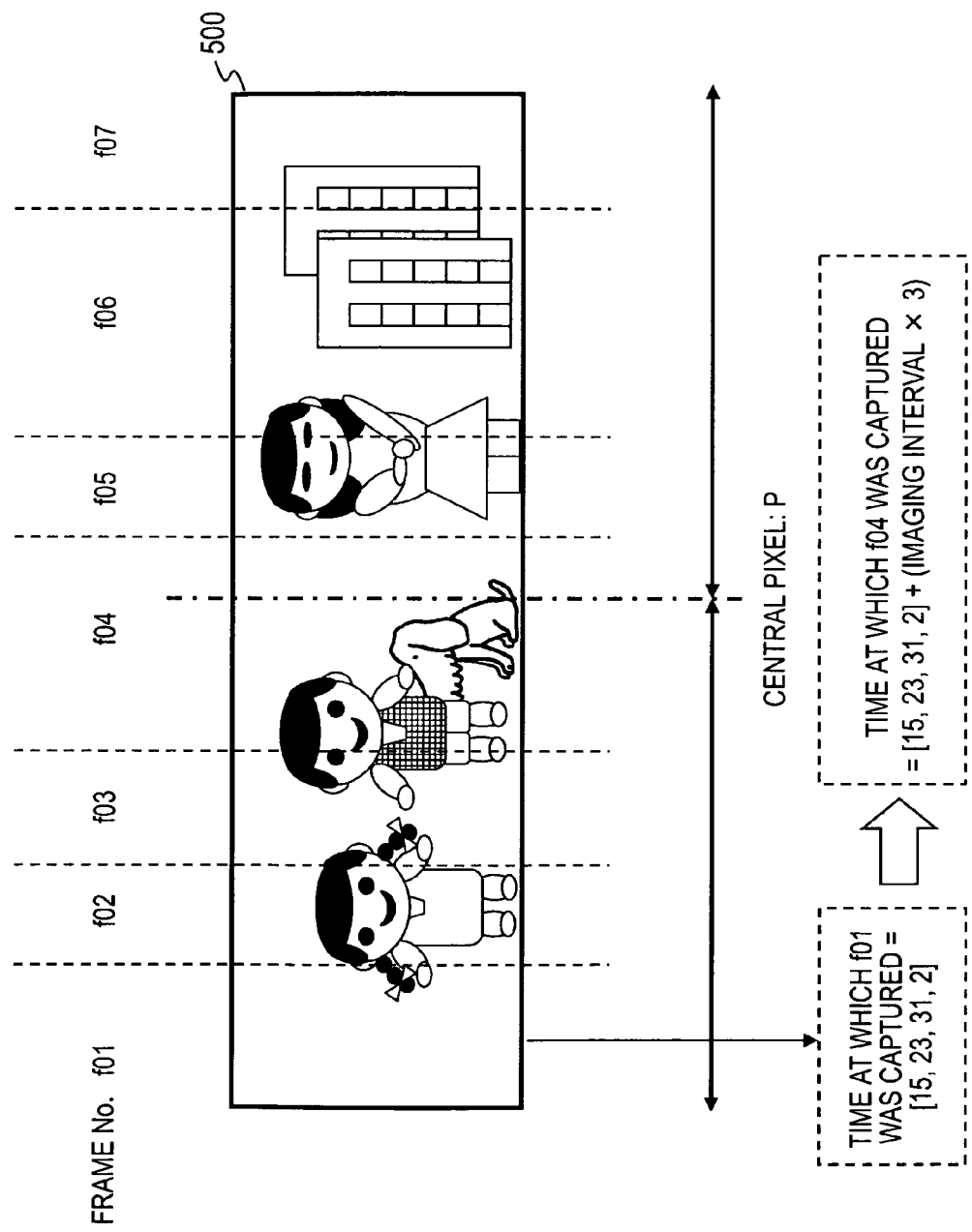

IMAGING APPARATUS, DATA PROCESSING METHOD, AND PROGRAM

BACKGROUND OF THE INVENTION

1. Field of the Invention

The present invention relates to an imaging apparatus, a data processing method, and a program, and particularly to an imaging apparatus, a data processing method, and a program for recording an image captured with the imaging apparatus records along with orientation information representing the direction in which the image was captured.

2. Description of the Related Art

In recent years, there has been a camera that includes an orientation sensor for detecting the direction in which the camera is oriented and, when capturing an image, acquires orientation information representing the imaging direction acquired with the orientation sensor. A camera of this type records the captured image along with the orientation information as attribute information (meta information) associated with the captured image on a medium (storage means).

Orientation information recorded on a medium as attribute information associated with an image is used, for example, to indicate the imaging direction on a map displayed on a display section of a PC or any other apparatus. Alternatively, when a panoramic image is produced by combining a plurality of continuously captured images, orientation information is used to determine the direction in which each of the images was captured. Orientation information is used in a variety of other applications.

An imaging apparatus that acquires and records orientation information is described, for example, in JP-A-2005-110031 and JP-A-2005-26859.

In a digital camera or other similar cameras, however, the timing at which an image is captured is not identical to the timing at which the captured image is recorded on a medium. The time difference is caused by the fact that after an image is captured, it takes time to record the captured image. For example, after an image is captured, a data processor in the camera encodes the captured image, formats a recording medium, performs other processes, and then records the captured image on the medium. A digital camera thus typically requires a certain processing period after imaging and before recording.

In many cases, a camera of related art, when recording a captured image on a medium, acquires the latest orientation information from an orientation sensor equipped in the camera and records the orientation information as the information on the imaging direction. Any change in the direction in which the camera is oriented during the period from the timing at which an image is captured to the timing at which the image is recorded on the medium causes the recorded orientation information to differ from the direction in which the image was actually captured.

A specific example will be described with reference to FIGS. 1 and 2.

FIG. 1 describes an image capturing and recording sequence in a typical single or continuous image capturing process.

FIG. 2 describes the sequence of capturing a plurality of images while moving a camera, processing the captured images in the camera to produce a horizontally elongated panoramic image, and recording the panoramic image.

An image capturing and recording sequence in a typical single or continuous image capturing process will first be described with reference to FIG. 1. FIG. 1 shows the sequence of (a) imaging,
(b) recording, and
(c) acquiring orientation information. Time (t) elapses from left to right.

A user first captures an image 1 at time t1. The user then captures an image 2 at time t2, subsequently captures images afterward, and captures an image N at time t3. It is assumed that a total of N images are captured. The user captures images while changing the direction in which the camera is oriented.

Each of the captured images is encoded by a signal processor in the camera into a JPEG image or any other suitable compressed image. The encoded images, before recorded, are further converted into data compliant with a specified image recording format, such as the EXIF format. After these processes, the data are recorded on a flash memory or any other suitable recording medium.

As described above, the encoding and other signal processing typically require predetermined periods. The image 1, the image 2, and the image N are therefore recorded on the medium at time t4, t5, and t6, respectively, as shown in FIG. 1.

A sensor that acquires orientation information provides a controller (CPU) with information acquired with the sensor at pre-specified sampling time intervals. The controller acquires the latest orientation information acquired when a captured image is recorded on the medium and records the acquired orientation information on the medium.

As a result, the orientation information recorded in attribute information (meta information) associated with the image 1 is orientation information inputted from the orientation sensor immediately before the time t4, at which the image 1 is recorded. As a result, wrong orientation information of [135°] is recorded as the information representing the direction in which the image 1 was captured, as shown in FIG. 1. The recorded orientation information obviously differs from the orientation information of [0°] at the time when the image 1 was actually captured (t1).

Similarly, for the image 2 captured at the time t2, orientation information of [180°] acquired immediately before the image 2 is recoded at the time t4 is recorded, but the recorded orientation information differs from the orientation information of [45°] at the time of actual imaging action (t2).

As described above, the time lag between the imaging timing and the recording timing causes orientation information different from the orientation information at the time of the actual imaging action to be recorded as attribute information (meta information) associated with the captured image.

FIG. 2 describes the sequence of capturing a plurality of images while moving a camera, processing the captured images in the camera to produce a horizontally elongated panoramic image, and recording the panoramic image. FIG. 2 shows the sequence of (a) imaging,
(b) recording, and
(c) acquiring orientation information, as in FIG. 1. Time (t) elapses from left to right.

The user sets the camera into a panoramic imaging mode and captures a plurality of images while moving the camera. After the images are captured, a data processor in the camera connects the plurality of images to produce a panoramic image and records the panoramic image on a recording medium.

In FIG. 2, time to represents the central time of the period during which the plurality of images that form the panoramic image are captured. After the user captures the plurality of images, the camera combines the images to produce a panoramic image, encodes the panoramic image into a JPEG image or any other suitable compressed image, and before recording the encoded image, converts it into data compliant with a specified image recording format. After these processes, the data are recorded on a flash memory or any other suitable recording medium.

The data processing described above typically requires a predetermined period, and the panoramic image is recorded on the medium at time tb, as shown in FIG. 2. In this case as well, the controller in the camera acquires the latest orientation information acquired when one of the captured images is recorded on the medium and records the acquired orientation information on the medium.

As a result, the orientation information recorded in meta information associated with the panoramic image 1 is orientation information inputted from the orientation sensor immediately before the time tb, at which the panoramic image 1 is recorded. As a result, wrong orientation information of [180°] is recorded as the information representing the direction in which the panoramic image 1 was captured, as shown in FIG. 2. The recorded orientation information obviously differs from the orientation information of [45°] at the time when the panoramic image 1 was actually captured (ta).

As described above, the time lag between the imaging timing and the recording timing causes orientation information different from the orientation information at the time of the actual imaging action to be recorded as attribute information (meta information) associated with the captured images.

On the other hand, an orientation sensor equipped in a camera is in many cases configured to acquire orientation information by using a combination of a magnetic sensor that detects earth magnetism and an acceleration sensor. The magnetic sensor, however, outputs a wrong detected value in some cases due to magnetism produced by a drive mechanism and an electronic member in the camera, that is, disturbance.

Specifically, the magnetic sensor may output a wrong detected value due to magnetism produced, for example, when a lens is driven at the time of focus adjustment or any other process during imaging operation.

An imaging apparatus of the state of the art, that is, an imaging apparatus that acquires orientation information, relates the orientation information to a corresponding image, and records them therefore has the following problems.

(a) Decrease in precision in orientation information due to the discrepancy between the time at which an image to be recorded on a medium is captured and the time at which orientation information is acquired (b) Decrease in precision in orientation information due to disturbance

SUMMARY OF THE INVENTION

It is desirable to provide an imaging apparatus, a data processing method, and a program that allow precise orientation information associated with an image captured with the imaging apparatus to be recorded.

An embodiment of the invention is directed to an imaging apparatus including an orientation sensor that detects orientation representing the direction in which the imaging apparatus is oriented, a controller that produces data formed of a captured image and attribute information associated with the captured image and records the data in a recording section; and the recording section that stores a captured image and attribute information.

The controller successively records an entry in a memory, the entry relating orientation information calculated by successively receiving a value detected with the orientation sensor to a time stamp representing the time at which the detected value is inputted from the orientation sensor, extracts a plurality of entries having time stamps close to the time at which the image was captured from the entries stored in the memory, and calculates orientation information representing the direction in which the image was captured by using the plurality of pieces of orientation information in the extracted entries.

In one embodiment of the imaging apparatus according to the invention, the controller extracts a plurality of entries having time stamps close to the time at which the image was captured from the entries recorded in the memory, reselects a small number of entries having intermediate values of orientation information from the pieces of orientation information in the extracted entries, and sets the average of the pieces of orientation information in the plurality of reselected entries as orientation information representing the direction in which the image was captured.

In one embodiment of the imaging apparatus according to the invention, the controller selects a single representative entry having a time stamp closest to the time at which the image was captured from the entries recorded in the memory, selects a specified number of near entries having time stamps close to the time stamp of the representative entry, sorts the plurality of entries formed of the representative entry and the near entries in increasing or decreasing order of magnitude of orientation information, removes at least the greatest and smallest end entries from the sorted entries, averages the values of orientation information in the remaining intermediate entries, and sets the average as the orientation information representing the direction in which the image was captured.

In one embodiment of the imaging apparatus according to the invention, the controller acquires time at which each continuously captured image was captured, extracts a plurality of entries having time stamps close to the time at which each continuously captured image was captured from the entries recorded in the memory, and calculates orientation information representing the direction in which each continuously captured image was captured by using the plurality of pieces of orientation information in the extracted entries.

In one embodiment of the imaging apparatus according to the invention, the controller extracts a plurality of entries having time stamps close to the time at which a central image of a panoramic image produced by combining a plurality of captured images was captured from the entries recorded in the memory and calculates orientation information representing the direction in which the panoramic image was captured by using the plurality of pieces of orientation information in the extracted entries.

In one embodiment of the imaging apparatus according to the invention, the controller calculates the time at which the central image of the panoramic image was captured from the time at which an imaging start frame of the panoramic image was captured.

Another embodiment of the invention is directed to a data processing method performed in an imaging apparatus, the method including allowing a controller to successively record an entry in a memory, the entry relating orientation information calculated by successively receiving a value detected with an orientation sensor that detects orientation representing the direction in which the imaging apparatus is oriented to a time stamp representing the time at which the detected value is inputted from the orientation sensor, allowing the controller to acquire the time at which an image was captured, and allowing the controller to extract a plurality of entries having time stamps close to the time at which the image was captured from the entries recorded in the memory and calculate orientation information representing the direction in which the image was captured by using the plurality of pieces of orientation information in the extracted entries.

Still another embodiment of the invention is directed to a program that instructs an imaging apparatus to perform data processing including allowing a controller to successively record an entry in a memory, the entry relating orientation information calculated by successively receiving a value detected with an orientation sensor that detects orientation representing the direction in which the imaging apparatus is oriented to a time stamp representing the time at which the detected value is inputted from the orientation sensor, allowing the controller to acquire the time at which an image was captured, and allowing the controller to extract a plurality of entries having time stamps close to the time at which the image was captured from the entries recorded in the memory and calculate orientation information representing the direction in which the image was captured by using the plurality of pieces of orientation information in the extracted entries.

The program according to this embodiment of the invention can be provided in the form of a computer readable recording medium or communication medium to an information processing apparatus or a computer system capable of executing a variety of program codes. Providing the program in a computer readable form allows the information processing apparatus or the computer system to perform processes according to the program.

Other objects, features, and advantages of the invention will be apparent from more detailed description when taken in connection with the following embodiment of the invention and accompanying drawings. The word "system" used herein means a logical set of a plurality of devices, and the constituent devices of the "system" are not necessarily incorporated in a single housing.

According to the configuration of the embodiments of the invention, an entry that relates orientation information calculated by successively receiving a value detected with an orientation sensor that detects orientation representing the direction in which an imaging apparatus is oriented to a time stamp representing the time at which the detected value is inputted from the orientation sensor is successively recorded in a memory. When an image is captured, a plurality of entries having time stamps close to the time at which the image was captured are extracted from the memory, and the plurality of pieces of orientation information in the extracted entries are used to calculate orientation information representing the direction in which the image was captured. The calculated orientation information is then recorded as attribute information associated with the image. In this configuration, the orientation information data to be recorded as the attribute information associated with the image can be calculated based on a plurality of pieces of orientation information acquired by the orientation sensor before and after the time at which the image was captured. Further, since orientation information data reselected by removing data on both ends of the plurality of pieces of sorted orientation information are averaged, precise orientation information without abnormal values due to disturbance or other factors can be recorded as meta data associated with the image.

BRIEF DESCRIPTION OF THE DRAWINGS

FIG. 14 describes an exemplary process of calculating panoramic image captured time performed in the imaging apparatus according to the embodiment of the invention.

DESCRIPTION OF THE PREFERRED EMBODIMENTS

An imaging apparatus, a data processing method, and a program according to an embodiment of the invention will be described below with reference to the drawings. The description is formed of the following items and made in the following order.

1. Exemplary configuration of an imaging apparatus

2. Processes performed by the imaging apparatus according to the embodiment of the invention 3. Details of calculating and recording orientation information associated with a captured image 4. Sequence of processes performed by the imaging apparatus according to the embodiment of the invention

[1. Exemplary Configuration of an Imaging Apparatus]

An exemplary configuration of an imaging apparatus according to an embodiment of the invention will first be described with reference to FIG. 3.

Figure 3:
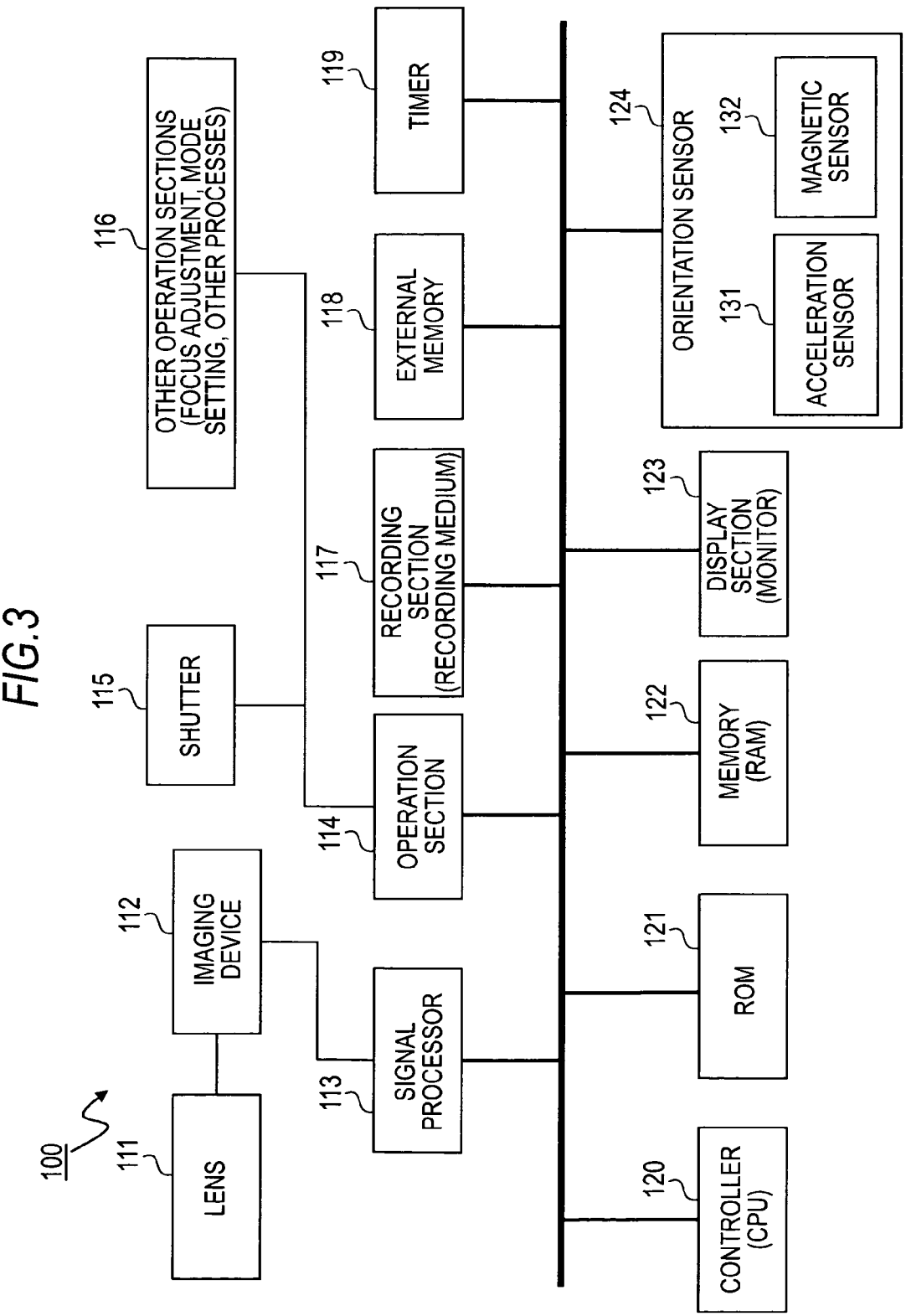
FIG. 3 describes an exemplary configuration of an imaging apparatus according to an embodiment of the invention.

FIG. 3 shows an exemplary configuration of an imaging apparatus 100 according to the embodiment of the invention. The imaging apparatus 100 according to the embodiment of the invention includes a lens 111 through which an image of a subject is inputted, an imaging device 112 that converts the optical signal inputted through the lens 111 into an electric signal, and a signal processor 113 that receives the electric signal produced by the imaging device 112 and performs signal processing on the received signal, as shown in FIG. 3.

The signal processor 113 performs not only white balance adjustment, gamma correction, interpolation, and a variety of other signal processing but also encoding as a process of producing a compressed image, such as a JPEG image. A controller 120 converts the image produced by the signal processor 113 into an image to be recorded, for example, in the EXIF format, which is an image recording format, and records the resultant image in a recording section (recording medium) 117.

An operation section 114 is formed of a shutter 115 and other operation sections 116 for focus adjustment, mode setting, and other purposes.

The recording section (recording medium) 117 is formed, for example, of a flash memory, a magnetic disk, an optical disk, or any other variety of media.

An external memory 118 is a disk or any other media that can be arbitrarily loaded.

A user can selectively use the recording section (recording medium) 117 and the external memory 118 as a destination onto which an image is recorded.

A timer 119 is a clock for timekeeping. The timer 119 may be a clock that performs realtime timekeeping or a counter that increments the count expressed in a predetermined period unit.

The controller 120 controls imaging, recording, acquiring orientation information from an orientation sensor 124, and other processes performed in the imaging apparatus 100. The processes described above are performed in accordance with a program stored, for example, in a ROM 121.

The program necessary to control the processes performed in the controller 120 is stored, for example, in the ROM 121, and the controller (CPU) 120 performs a variety of processes in accordance with the program.

A memory (RAM) 122 is used as a work area for a variety of processes performed in the controller (CPU) 120 in accordance with the program. The memory (RAM) 122 is also used as an area for storing images and a variety of pieces of setting information. The memory (RAM) 122 is also used as an area for recording orientation information acquired with the orientation sensor 124. Old orientation information data are successively overwritten with new orientation information data. The memory (RAM) 122 is formed, for example, of a ring buffer.

A display section (monitor) 123 is formed, for example, of a LCD display and used to display a captured image or operation information and setting information presented to the user.

The orientation sensor 124 detects orientation representing the direction in which the imaging apparatus is oriented (the direction in which the lens of the imaging apparatus is oriented, such as the north, south, east, or west) and is formed of an acceleration sensor 131 and a magnetic sensor 132.

The orientation sensor 124 provides the controller 120 at preset sampling time intervals (100 msec, for example) with sensor detection information from which the orientation of the imaging apparatus can be calculated. The controller 120 calculates orientation information representing the direction in which the imaging apparatus is oriented based on the information detected with the acceleration sensor 131 and the magnetic sensor 132 in accordance with a preset algorithm and records the calculated orientation information in the memory 122.

When recording the orientation information in the memory 122, the controller 120 also records a time stamp representing orientation information detected time inputted from the timer 119. This process and how to record orientation information in the memory 122 will be described later in detail.

As described above, the controller 120 records an entry that relates orientation information calculated from a value detected with and successively inputted from the orientation sensor 124 to a time stamp representing the time when the detected value from the orientation sensor 124 is inputted. Further, when an image is captured, the controller 120 extracts from the memory 122 a plurality of entries having time stamps close to the time at which the image was captured and uses the plurality of pieces of orientation information in the extracted entries to calculate the orientation information representing the direction in which the image was captured. The calculation will be described later in detail. The controller 120 records the image along with the thus calculated orientation information as attribute information associated with the image in the recording section (recording medium) 117.

[2. Processes Performed by the Imaging Apparatus According to the Embodiment of the Invention]

The processes performed by the imaging apparatus 100 according to the embodiment of the invention will next be described.

A description will first be made of the sequence of processes performed by the imaging apparatus 100 according to the embodiment of the invention, a process of capturing images and a process of recording the image along with precise orientation information acquired when the image was captured with reference to FIGS. 4 to 6.

Figure 1:
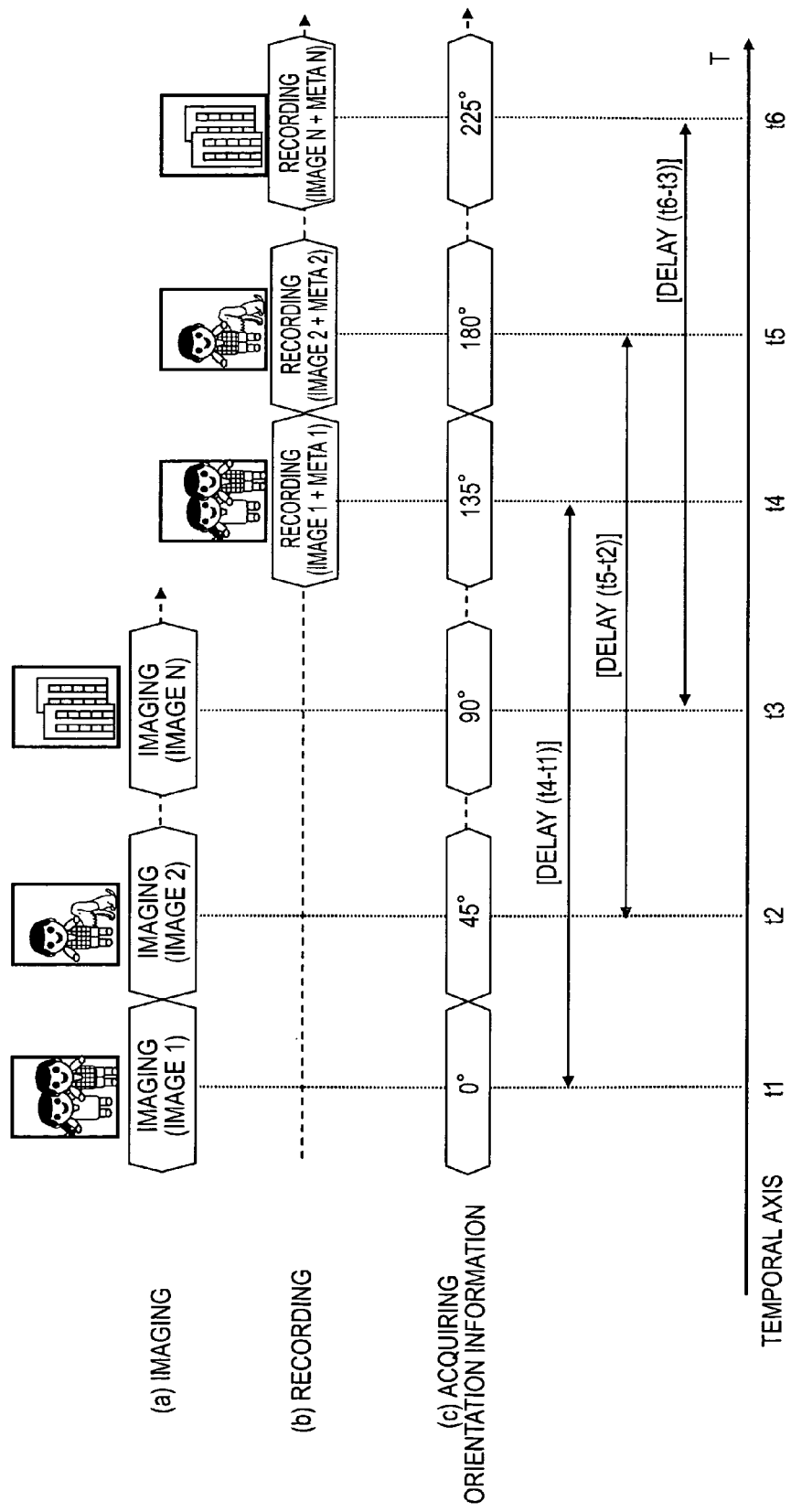
FIG. 1 describes an image capturing and recording sequence in a typical single or continuous image capturing process.
Figure 2:
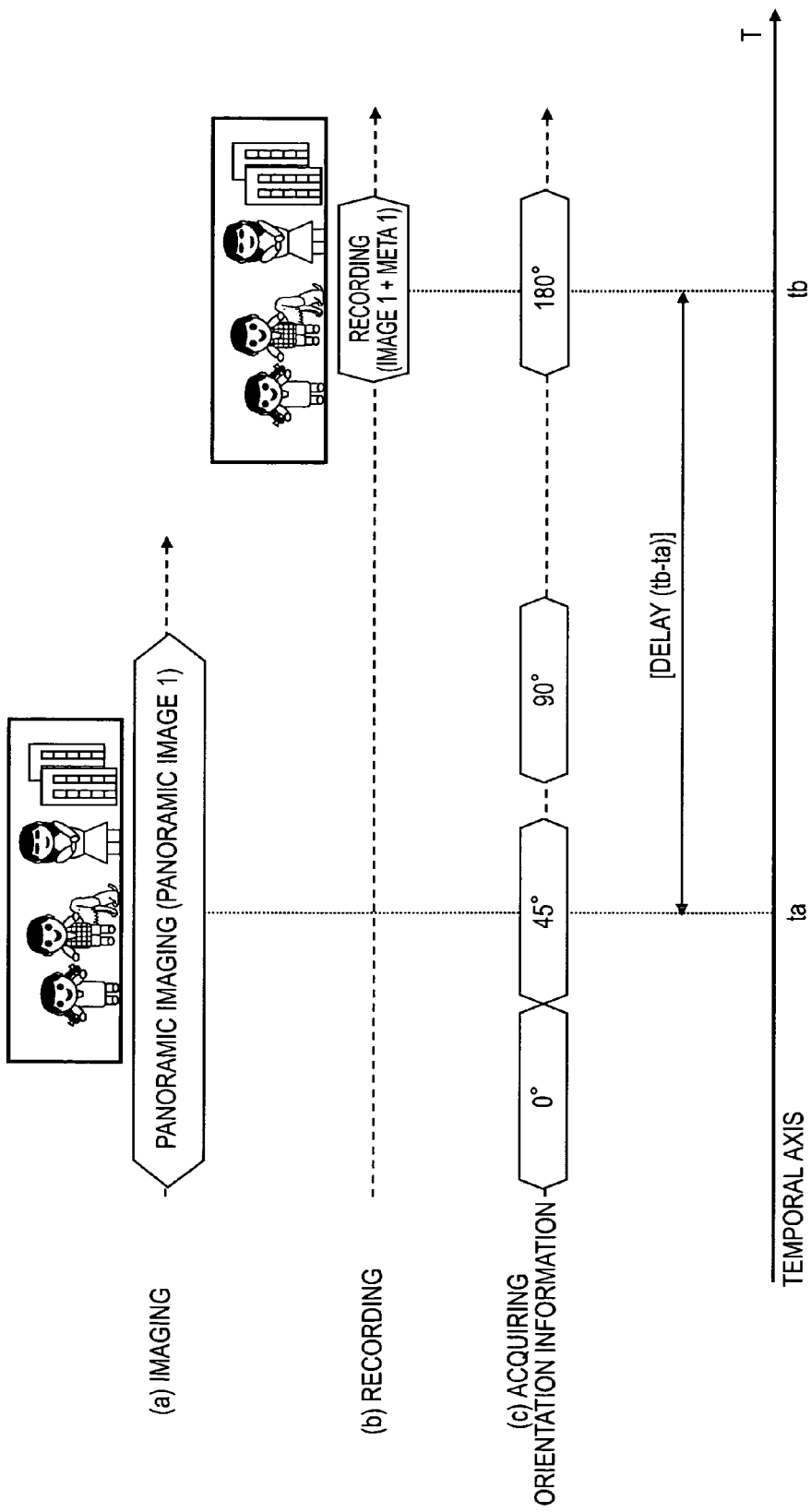
FIG. 2 describes the sequence of capturing a plurality of images while moving a camera, processing the captured images in the camera to produce a horizontally elongated panoramic image, and recording the panoramic image.
Figure 4:
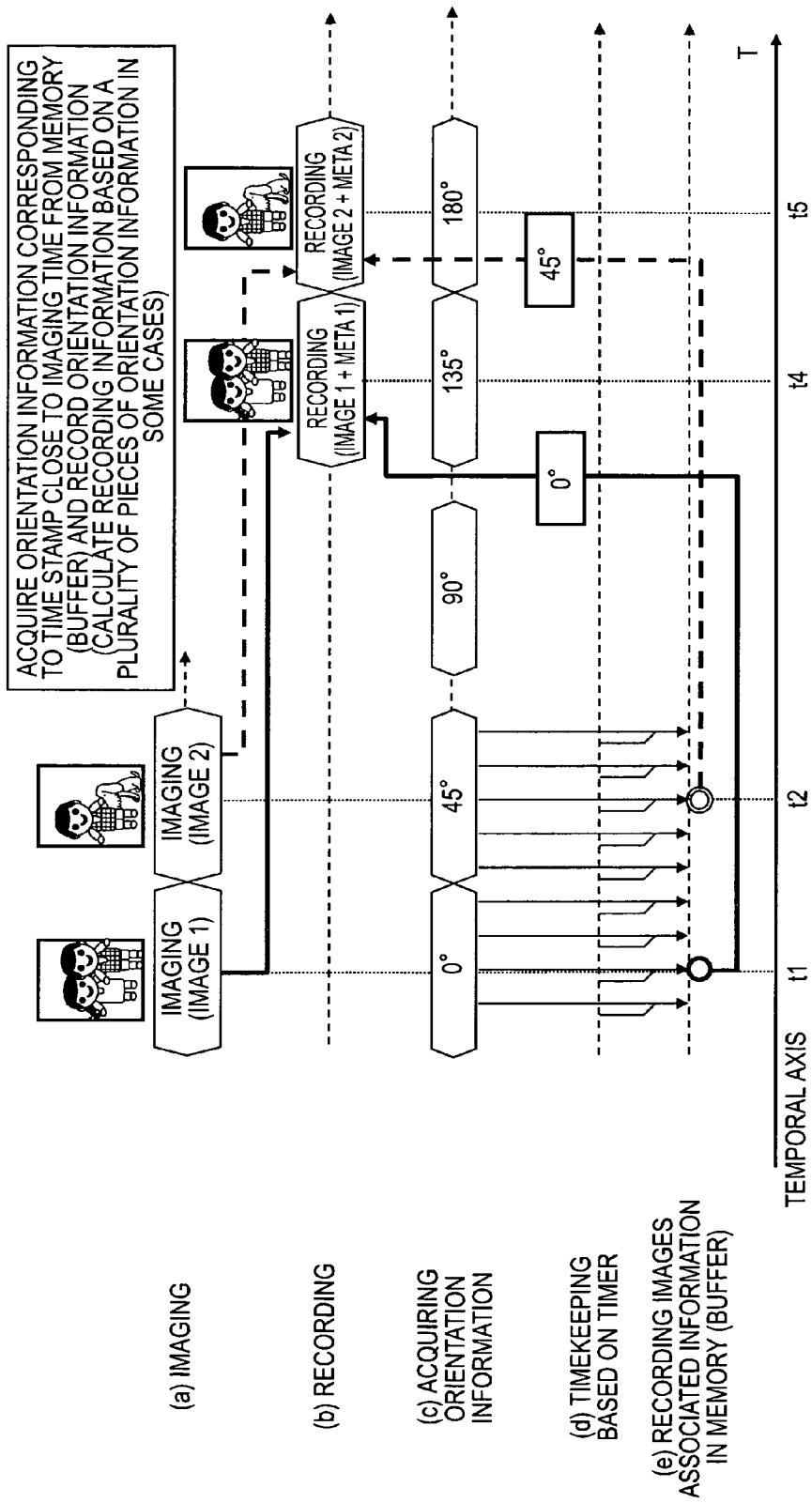
FIG. 4 describes an image capturing and recording sequence in a single or continuous image capturing process performed by the imaging apparatus according to the embodiment of the invention.
Figure 5:
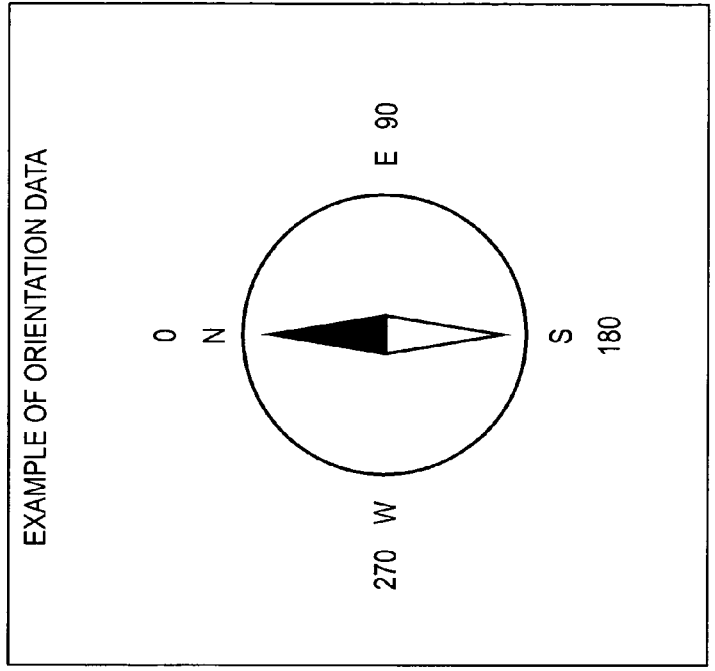
FIGS. 5A and 5B describe an example of recorded data that the imaging apparatus according to the embodiment of the invention stores in a memory.
Figure 6:
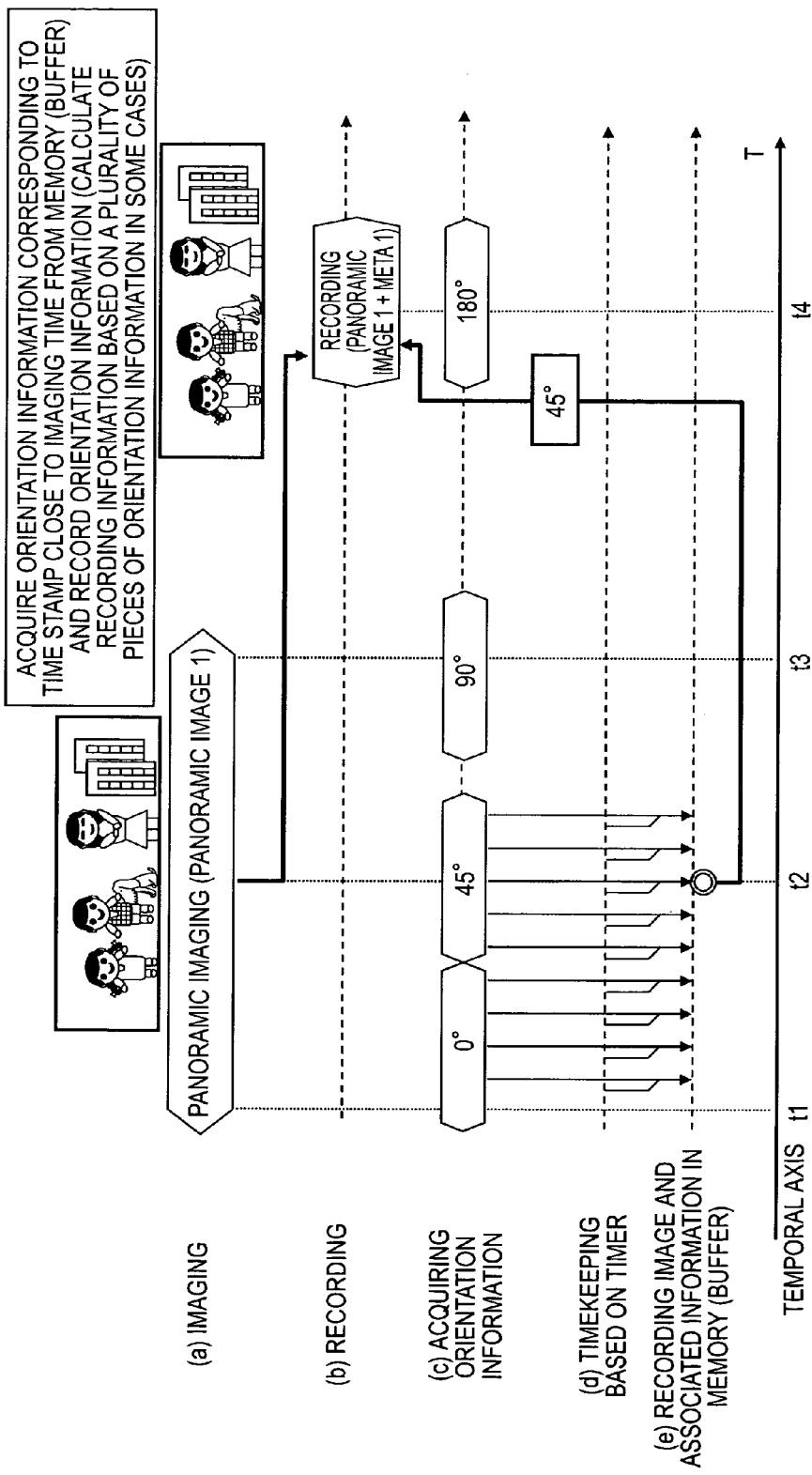
FIG. 6 describes a panoramic image capturing and recording sequence performed by the imaging apparatus according to the embodiment of the invention.

FIGS. 4 and 6 show exemplary processes that are performed by the imaging apparatus according to the embodiment of the invention and correspond to those described in FIGS. 1 and 2.

That is, FIG. 4 describes an image capturing and recording sequence in a typical single or continuous image capturing process.

FIG. 6 describes the sequence of capturing a plurality of images while moving the camera, processing the captured images in the camera to produce a horizontally elongated panoramic image, and recording the panoramic image.

FIGS. 5A and 5B show an example of data recorded in the memory (ring buffer, for example) in the imaging apparatus according to the embodiment of the invention. The data recorded in the memory relate orientation information acquired with the orientation information acquiring sensor to a time stamp representing the time at which the orientation information was acquired.

The image capturing and recording sequence in a typical single or continuous image capturing process will first be described with reference to FIG. 4. FIG. 4 shows the sequence of:

(a) imaging,
(b) recording,
(c) acquiring orientation information,
(d) timekeeping based on the timer, and
(e) recording images and associated information in the memory (buffer). Time (t) elapses from left to right.

The user first captures an image 1 at time t1. The user then captures an image 2 at time t2 and subsequently captures images afterward. The user captures images while changing the direction in which the camera is oriented. Each of the captured images is encoded by the signal processor in the camera into a compressed image, such as a JPEG image, which is, before recorded, further converted into data compliant with a specified image recording format, such as the EXIF format. After these processes, the data are recorded on a flash memory or any other suitable recording medium.

The encoding and other signal processing typically require predetermined periods. The images are therefore recorded on the medium at the following timings: The image 1 is recorded at time 4 and the image 2 is recorded at time t5, as shown in FIG. 4.

The orientation sensor 124, which acquires orientation information, provides the controller (CPU) 120 with information acquired by the sensor at pre-specified sampling time intervals (100 msec, for example). The controller 120 records the information acquired by the sensor along with the information on the time measured by the timer 119 in the memory (buffer) 122. The orientation information acquired with the sensor at each sampling time and the time stamp representing the time at which the orientation information was acquired are related to each other and recorded in the memory 122.

FIGS. 5A and 5B show an example of the data recorded in the memory. As shown in FIGS. 5A and 5B, orientation information acquired by the orientation sensor 124 and calculated in the controller 120 and the time stamp representing the time at which the orientation information was acquired are related to each other and recorded in the memory 122.

A pre-specified orientation information recording area is set in the memory 122, and orientation information and a time stamp based on the information acquired by the orientation sensor 124 are continuously recorded in the memory area. For example, the area set in the memory 122 holds 200 pieces of sampled data, and old data are sequentially overwritten with new data when the number of data exceeds 200. The latest 200 pieces of orientation information along with respective time stamps are therefore recorded in the memory 122. When the sampling time intervals are set at 100 msec, 200 pieces of orientation information along with the time stamps related thereto for the latest 20 seconds are stored and maintained in the memory 122.

In the example shown in FIGS. 5A and 5B, 200 pieces of orientation information acquired at intervals of 100 msec from 12:00:00:0 [hours, minutes, seconds, hundred milliseconds] to 12:00:19:9 [hours, minutes, seconds, hundred milliseconds] are recorded. It is noted that the orientation information is expressed by a number ranging from 0 to 360 degrees, for example, the north (N)=0, the east (E)=90, the south (S)=180, and the west (W)=270.

In the example shown in FIGS. 5A and 5B, the time stamp is expressed by actual time information acquired from the timer 119. The timer 119 may be replaced, for example, with a counter as described above, and the count is recorded in this case.

An example of a useable counter is a video field counter (VFC) in the camera display. A VFC counter is a counter that starts counting when the system starts and increments the count whenever a new video field is displayed. The count of the VFC counter may replace actual time data, and using the VFC counter advantageously results in cost reduction because no new timer or other similar component needs to be added.

The controller 120 acquires information representing imaging time from the timer 119 (or a counter) even when an image is being captured. When recording a captured image in the recording section (recording medium) 117, the controller 120 acquires from the memory 122 a plurality of pieces of orientation information having time stamps close to the time at which the image was captured, calculates orientation information based on the plurality of pieces of acquired orientation information, and records the calculated orientation information as orientation information associated with the captured image in the recording section (recording medium) 117.

For example, in the example shown in FIG. 4, the image 1 is captured at the time (t1) and then recorded on the medium at the time (t4) because time elapsed during the subsequent encoding and other processes. In the configuration of the invention, instead of the orientation information acquired at the time (t4), at which the image 1 is recorded on the medium, a plurality of pieces of orientation information having time stamps close to the imaging time (t1) are acquired from the memory. Thereafter, one piece of orientation information is calculated from the plurality of pieces of acquired orientation information by performing calculation described below, and the calculated orientation information is recorded as attribute information (meta information) associated with the image 1 on the medium.

The same applies to the image 2. Instead of the orientation information acquired at the time (t5), at which the image 2 is recorded on the medium, a plurality of pieces of orientation information having time stamps close to the time (t2), at which the image 2 was captured, are acquired from the memory. Thereafter, orientation information is calculated in accordance with predetermined calculation, and the calculated orientation information is recorded as meta information associated with the image 2 on the medium.

The calculation of orientation information recorded as meta information associated with an image will be described later in detail.

FIG. 6 describes the sequence of processes of capturing a plurality of images while moving the imaging apparatus (camera), processing the captured images in the camera to produce a horizontally elongated panoramic image, and recording the panoramic image. FIG. 6 also shows the sequence of:
 (a) imaging,
 (b) recording,
 (c) acquiring orientation information,
 (d) timekeeping based on the timer, and
 (e) recording images and associated information in the memory (buffer),
as in FIG. 4. Time (t) elapses from left to right.

The user sets the camera into a panoramic imaging mode and continuously captures a plurality of images from time t1 to t3 while moving the camera. The camera connects the plurality of images to produce a single panoramic image, further performs encoding and other processes on the panoramic image in the internal signal processor, and then records the resultant image on the medium.

Producing a panoramic image and the encoding and other signal processing typically require predetermined periods. The timing at which the image is recorded on the medium is therefore delayed. Specifically, the panoramic image 1 is recorded on the medium at time t4, as shown in FIG. 6.

In this case as well, the controller 120 records the information acquired with the orientation sensor 124 along with the information on the time measured by the timer 119 in the memory 122, as in the processes described with reference to FIG. 4. The orientation information acquired at each sampling time based on the information detected with the orientation sensor 124 and the time stamp representing the time at which the orientation information was acquired are related to each other and recorded in the memory 122, as described with reference to FIGS. 5A and 5B. When the sampling time intervals are set at 100 msec, 200 pieces of orientation information along with the time stamps related thereto for the latest 20 seconds are stored and maintained in the memory 122.

When recording the captured images in the recording section (recording medium) 117, the controller 120 acquires the information on the time at which one the images was captured, acquires from the memory 122 a plurality of pieces of orientation information having time stamps close to the information on the time at which the image was captured, calculates orientation information associated with the image, and records the calculated orientation information on the medium. In the example shown in FIG. 6, the controller 120 acquires a plurality of pieces of orientation information having time stamps close to the time (t2), which is the central time of the period from t1 to t3 during which the panoramic image 1 was captured, calculates one piece of orientation information based on the plurality of pieces of orientation information, and records the calculated orientation information as meta information associated with the panoramic image 1 in the recording section (recording medium) 117.

Figure 7:
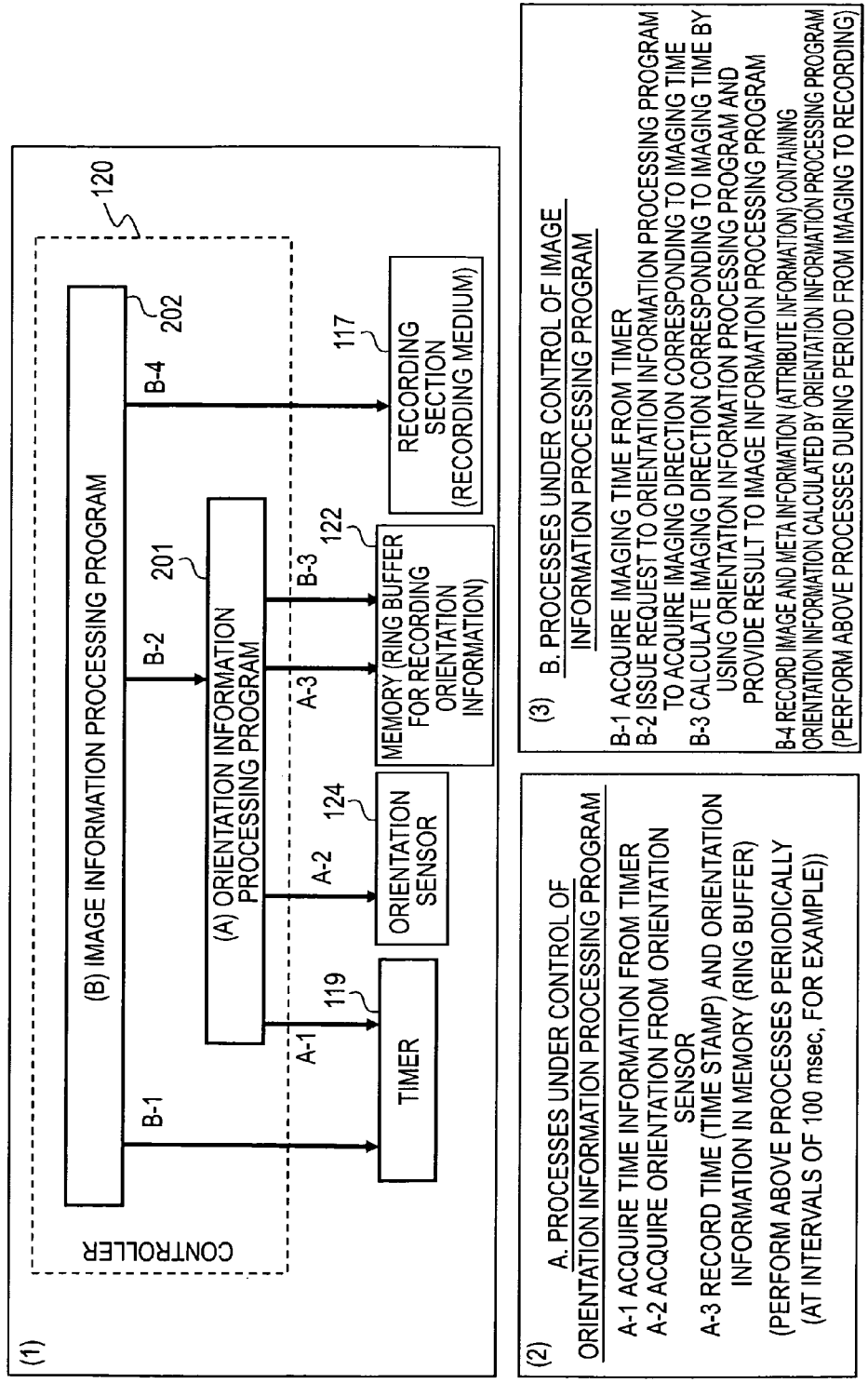
FIG. 7 is a stack diagram for describing processes performed by a controller in the imaging apparatus according to the embodiment of the invention.

FIG. 7 is a stack diagram for describing the processes performed by the controller 120 in the imaging apparatus 100 according to the embodiment of the invention.

The controller 120 executes the following programs:

(A) an orientation information processing program 201 and (B) an image information processing program 202, as shown in (1) in FIG. 7. The programs are recorded in advance in the ROM 121, and the controller 120 reads the programs from the ROM 121 and executes them.

(A) The orientation information processing program 201 is primarily responsible for acquiring orientation information from the orientation sensor 124 and recording the orientation information in the memory 122.

(B) The image information processing program 202 is primarily responsible for capturing and recording images.

The controller 120 performs processes (A-1) to (A-3) shown in (1) in FIG. 7 in accordance with the orientation information processing program 201 (A). (2) in FIG. 7 shows the processes in detail as follows.

A-1. Acquire time information from the timer

A-2. Acquire orientation from the orientation sensor

A-3. Record the time (time stamp) and the orientation information in the memory (ring buffer) 122

The processes described above are performed periodically (at intervals of 100 msec, for example).

The controller 120 further performs processes (B-1) to (B-4) shown in (1) in FIG. 7 in accordance with the image information processing program 202 (B). (3) in FIG. 7 shows the processes in detail as follows.

B-1. Acquire imaging time from the timer

B-2. Issue a request to the orientation information processing program to acquire the imaging direction corresponding to the imaging time B-3. Calculate the imaging direction corresponding to the imaging time by using the orientation information processing program and provide the result to the image information processing program B-4. Record the image and meta information (attribute information) containing the orientation information calculated by the orientation information processing program in the recording section (recording medium)

These processes are performed during the period from imaging to recording.

The orientation information processing program 201 and the image information processing program 202 cooperatively perform the process B-3.

[3. Details of Calculating and Recording Orientation Information Associated with a Captured Image]

The details of calculating and recording orientation information associated with a captured image will next be described with reference to FIGS. 8 to 10.

Figure 8:
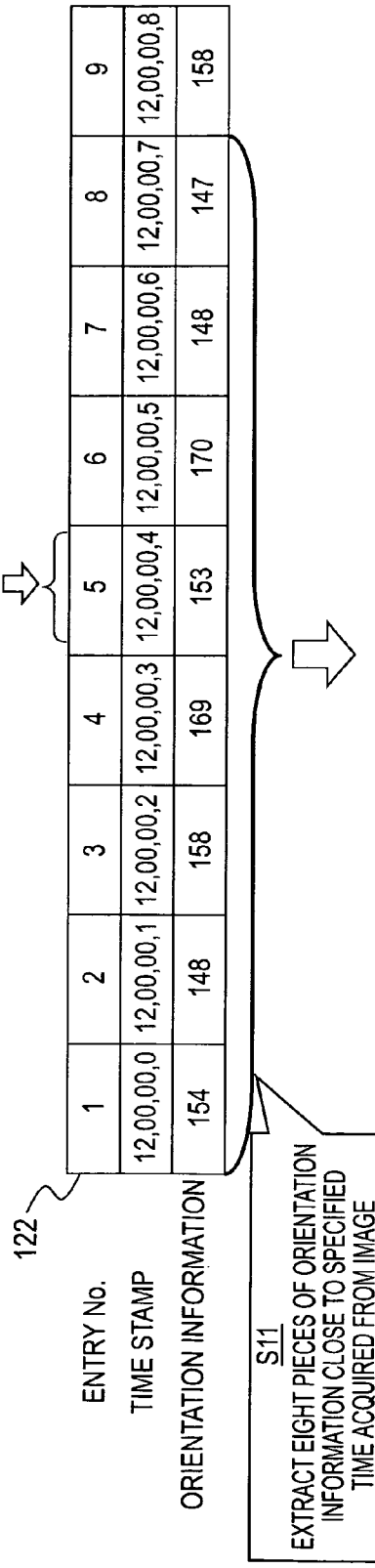
FIG. 8 describes details of calculating and recording orientation information associated with a captured image.
Figure 9:
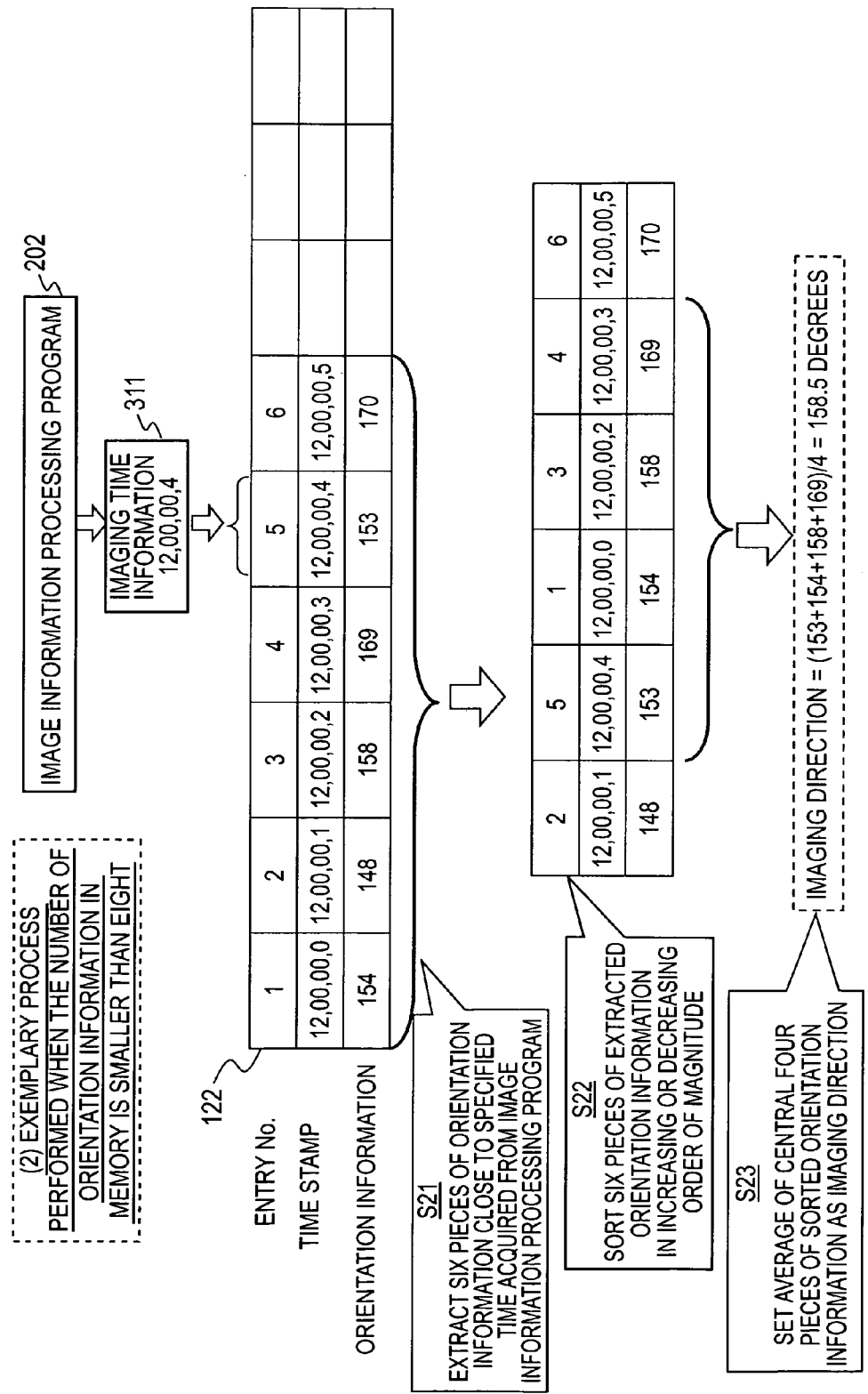
FIG. 9 describes details of calculating and recording orientation information associated with a captured image.
Figure 10:
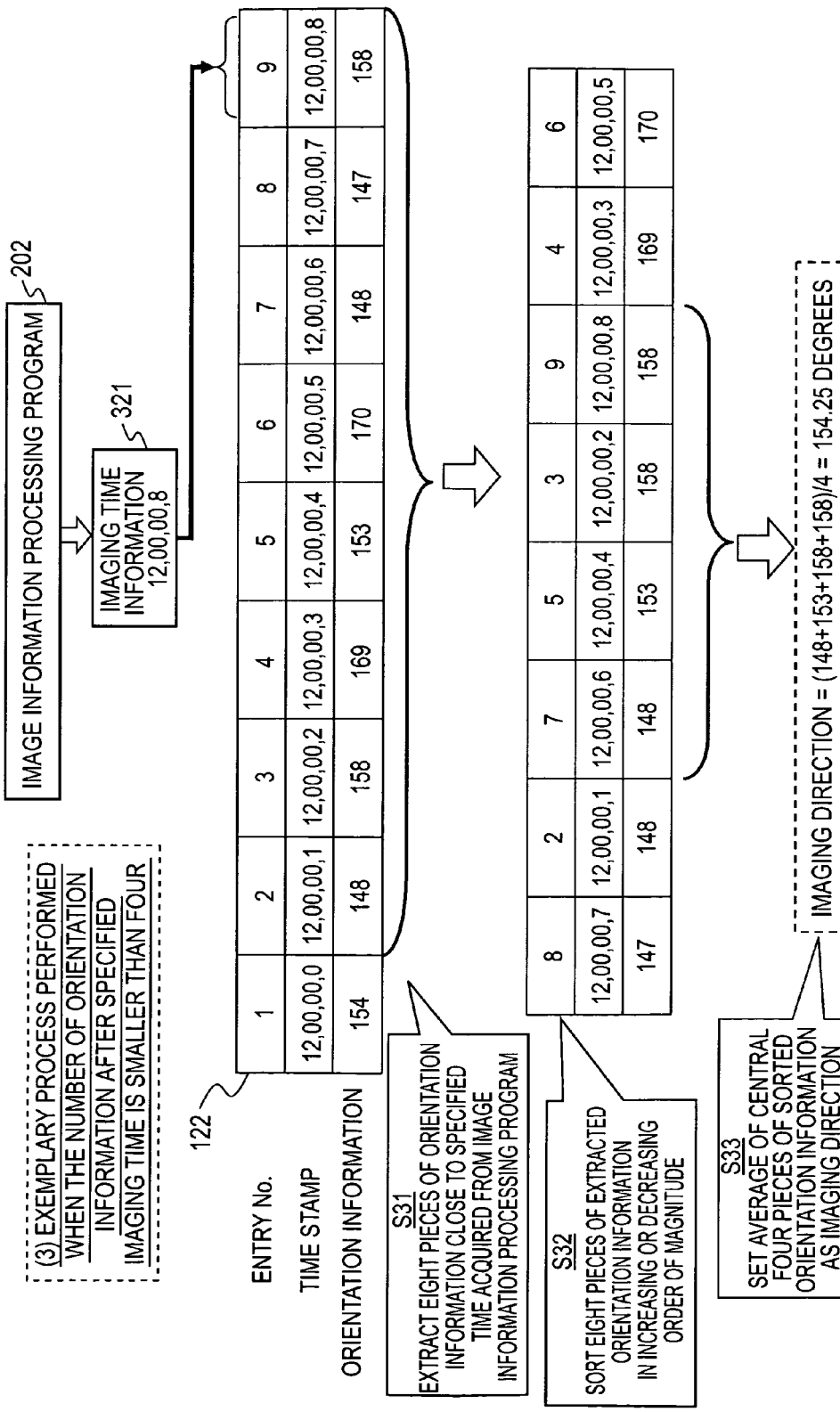
FIG. 10 describes details of calculating and recording orientation information associated with a captured image.

The processes described with reference to FIGS. 8 to 10 are details of the process B-3 shown in (3) in FIG. 7, that is, the details of the following process.

B-3. Calculate the imaging direction corresponding to the imaging time by using the orientation information processing program and provide the result to the image information processing program An exemplary basic process (1) will first be described with reference to FIG. 8.

To acquire orientation information associated with a captured image, the image information processing program 202 provides the orientation information processing program 201 with imaging time information 301 associated with the captured image.

It is assumed that the imaging time information 301 is [12, 00, 00, 4] (hours, minutes, seconds, hundred milliseconds), as shown in FIG. 8.

The controller 120 calculates orientation information to be related to the image and recorded in the recording section (recording medium) 117 based on the imaging time information [12, 00, 00, 4] in accordance with the orientation information processing program 201.

In step S11, the controller 120 first extracts from the memory 122 a plurality of pieces of orientation information, as data to be sorted, close to the specified time 301 acquired from the image information processing program 202, as shown in FIG. 8.

In this case, the specified time 301 is [12, 00, 00, 4].

From the data stored in the memory 122 that relate time stamps to orientation information, n entries (n=8 in the present example) having time stamps close to the specified time 301 (=[12, 00, 00, 4]) are extracted as data to be sorted. In this case, the entry having a time stamp closest to the specified time 301 (=[12, 00, 00, 4]) (entry 5) is considered as a center, and substantially the same number of entries are acquired from both sides of the entry 5. In this case, the entries No. 1 to No. 8 are extracted, as shown in FIG. 8.

In this example, the time stamp in the entry 5 completely coincides with the specified time 301 (=[12, 00, 00, 4]). In this case, as the eight entries including the entry 5 as the central entry, entries 1 to 8 or entries 2 to 9 are acquired. Either of the combinations can be arbitrarily chosen, and one of them is extracted in accordance with a preset algorithm. In either case, a plurality of entries are extracted as data to be sorted in such a way that the entry having a time stamp closest to the time at which the image described above was captured is substantially the central entry among the eight.

In step S12, the eight pieces of orientation information extracted from the memory 122 are sorted in increasing or decreasing order of magnitude of orientation information.

As shown in FIG. 8, the values of the orientation information in the entries 1 to 8 range from the smallest value of 147 to the greatest value of 170. The pieces of orientation information are sorted in increasing order of magnitude.

In step S13, the central four pieces of the sorted orientation information are averaged.

That is, the greatest and the second greatest entries and the smallest and the second smallest entries are removed from the sorted entries, and the orientation information only the intermediate four entries is considered as data to be calculated and then averaged. The reason for this is to remove values that greatly deviate from the central value due to disturbance or other factors as described above from those to be averaged.

As a result, the following four entries having intermediate values of orientation information are used as those to be averaged, as shown in FIG. 8.

Entry 7: orientation information [148]
Entry 5: orientation information [153]
Entry 1: orientation information [154]
Entry 3: orientation information [158]

The four entries are averaged in accordance with the following equation, and the average is the value of the orientation information associated with the image captured at the imaging time of [12, 00, 00, 4].

$$\text{imaging direction} = (148+153+154+158)/4 = 153.25 \text{ degrees}$$

The controller 120 records the thus calculated orientation information [153.25 degrees] as the orientation information associated with the image captured at the imaging time of [12, 00, 00, 4] in the recording section (recording medium) 117.

A description will next be made, with reference to FIG. 9, of an exemplary process performed in a case (2) where the number of orientation information stored in the memory is smaller than eight, which is the number of orientation information to be sorted that is specified in the basic process.

To acquire orientation information associated with a captured image, the image information processing program 202 provides the orientation information processing program 201 with imaging time information 311 associated with the captured image.

It is assumed that the imaging time information 311 is [12, 00, 00, 4], as shown in FIG. 9.

The procedure described above is the same as that in the exemplary basic processes (1) described with reference to FIG. 8.

The controller 120 calculates orientation information to be related to the image and recorded in the recording section (recording medium) 117 based on the imaging time information [12, 00, 00, 4] in accordance with the orientation information processing program 201.

In step S21, the controller 120 first extracts from the memory 122 a plurality of pieces of orientation information, as data to be sorted, close to the specified time 311 acquired from the image information processing program 202, as shown in FIG. 9.

In the exemplary basic process, the number of entries n to be extracted as those to be sorted is eight.

The memory 122, however, has stored only 6 pieces of orientation information in the entries 1 to 6, as shown in FIG. 9, and hence eight pieces of data may not be selected.

When the number of orientation information stored in the memory 122 is smaller than the specified number of data to be sorted (n=8) as described above, the controller 120 extracts all the entries (but smaller than eight), as data to be sorted, having time stamps close to the specified time 311[12, 00, 00, 4]. In this case, the six pieces of data in the entries No. 1 to No. 6 are extracted, as shown in FIG. 9.

In step S22, the six pieces of orientation information extracted from the memory 122 are sorted in increasing or decreasing order of magnitude of orientation information.

As shown in FIG. 9, the values of the orientation information in the entries 1 to 6 range from the smallest value of 148 to the greatest value of 170. The pieces of orientation information are sorted in increasing order of magnitude.

In step S23, the central four pieces of the sorted orientation information are averaged.

That is, the greatest entry and the smallest entry are removed from the sorted entries, and the orientation information only the intermediate four entries is considered as data to be calculated and then averaged. The reason for this is to remove values that greatly deviate from the central value due to disturbance or other factors as described above from those to be averaged.

As a result, the following four entries having intermediate values of orientation information are used as those to be averaged, as shown in FIG. 9.

Entry 5: orientation information [153]
Entry 1: orientation information [154]
Entry 3: orientation information [158]
Entry 4: orientation information [169]

The four entries are averaged in accordance with the following equation, and the average is the value of the orientation information associated with the image captured at the imaging time of [12, 00, 00, 4].

$$\text{imaging direction} = (153+154+158+169)/4 = 158.5 \text{ degrees}$$

The controller 120 records the thus calculated orientation information [158.5 degrees] as the orientation information associated with the image captured at the imaging time of [12, 00, 00, 4] in the recording section (recording medium) 117.

A description will next be made, with reference to FIG. 10, of an exemplary process performed in a case (3) where the memory has not stored any entry having a time stamp after the time stamp corresponding to the imaging time.

To acquire orientation information associated with a captured image, the image information processing program 202 provides the orientation information processing program 201 with imaging time information 321 associated with the captured image.

It is assumed that the imaging time information 321 is [12, 00, 00, 8], as shown in FIG. 10.

The procedure described above is the same as that in the exemplary basic process (1) described with reference to FIG. 8.

The controller 120 calculates orientation information to be related to the image and recorded in the recording section (recording medium) 117 based on the imaging time information [12, 00, 00, 8] in accordance with the orientation information processing program 201.

In step S31, the controller 120 first extracts from the memory 122 a plurality of pieces of orientation information, as data to be sorted, close to the specified time 321 acquired from the image information processing program 202, as shown in FIG. 10.

In the exemplary basic process, the number of entries n to be extracted as those to be sorted is eight, and data to be sorted are basically extracted in such a way that substantially the same number of data are extracted from both sides of the entry having a time stamp closest to the specified time 321, as described in the exemplary basic process (1).

An entry having a time stamp closest to the imaging time information [12, 00, 00, 8] stored in the memory 122 is the entry 9, but there is no entry having a time stamp corresponding to time thereafter in the memory 122, as shown in FIG. 10.

When the stored data is thus configured, eight entries may not be extracted in such a way that substantially the same number of entries are extracted from both sides of the entry 9.

In this case, the controller ignores the balance of the number of entries to be extracted from both sides of the entry 9 but extracts a plurality of entries (eight in the present example) including the entry 9 having a time stamp closest to the imaging time information [12, 00, 00, 8].

In the example shown in FIG. 10, eight entries, including the entry 9, having time stamps before that of the entry 9 are extracted as data to be sorted. In this case, eight pieces of data in the entries No. 2 to No. 9 are extracted, as shown in FIG. 10.

In step S32, the eight pieces of orientation information extracted from the memory 122 are sorted in increasing or decreasing order of magnitude of orientation information.

As shown in FIG. 10, the values of the orientation information in the entries 2 to 9 range from the smallest value of 147 to the greatest value of 170. The pieces of orientation information are sorted in increasing order of magnitude.

In step S33, the central four pieces of the sorted orientation information are averaged.

That is, the greatest and the second greatest entries and the smallest and the second smallest entries are removed from the sorted entries, and the orientation information only in the intermediate four entries is considered as data to be calculated and then averaged. The reason for this is to remove values that greatly deviate from the central value due to disturbance or any other factor as described above from those to be averaged.

As a result, the following four entries having intermediate values of orientation information are used as those to be averaged, as shown in FIG. 10.

Entry 7: orientation information [148]
Entry 5: orientation information [153]
Entry 3: orientation information [158]
Entry 9: orientation information [158]

The four entries are averaged in accordance with the following equation, and the average is the value of the orientation information associated with the image captured at the imaging time of [12, 00, 00, 8].

imaging direction=(148+153+158+158)/4=154.25 degrees

The controller 120 records the thus calculated orientation information [154.25 degrees] as the orientation information associated with the image captured at the imaging time of [12, 00, 00, 8] in the recording section (recording medium) 117.

[4. Sequence of Processes Performed by the Imaging Apparatus According to the Embodiment of the Invention]

The sequence of processes performed by the imaging apparatus according to the embodiment of the invention will next be described with reference to FIGS. 11 to 13. The sequence diagrams shown in FIGS. 11 to 13 describe the following processes.

Figure 11:
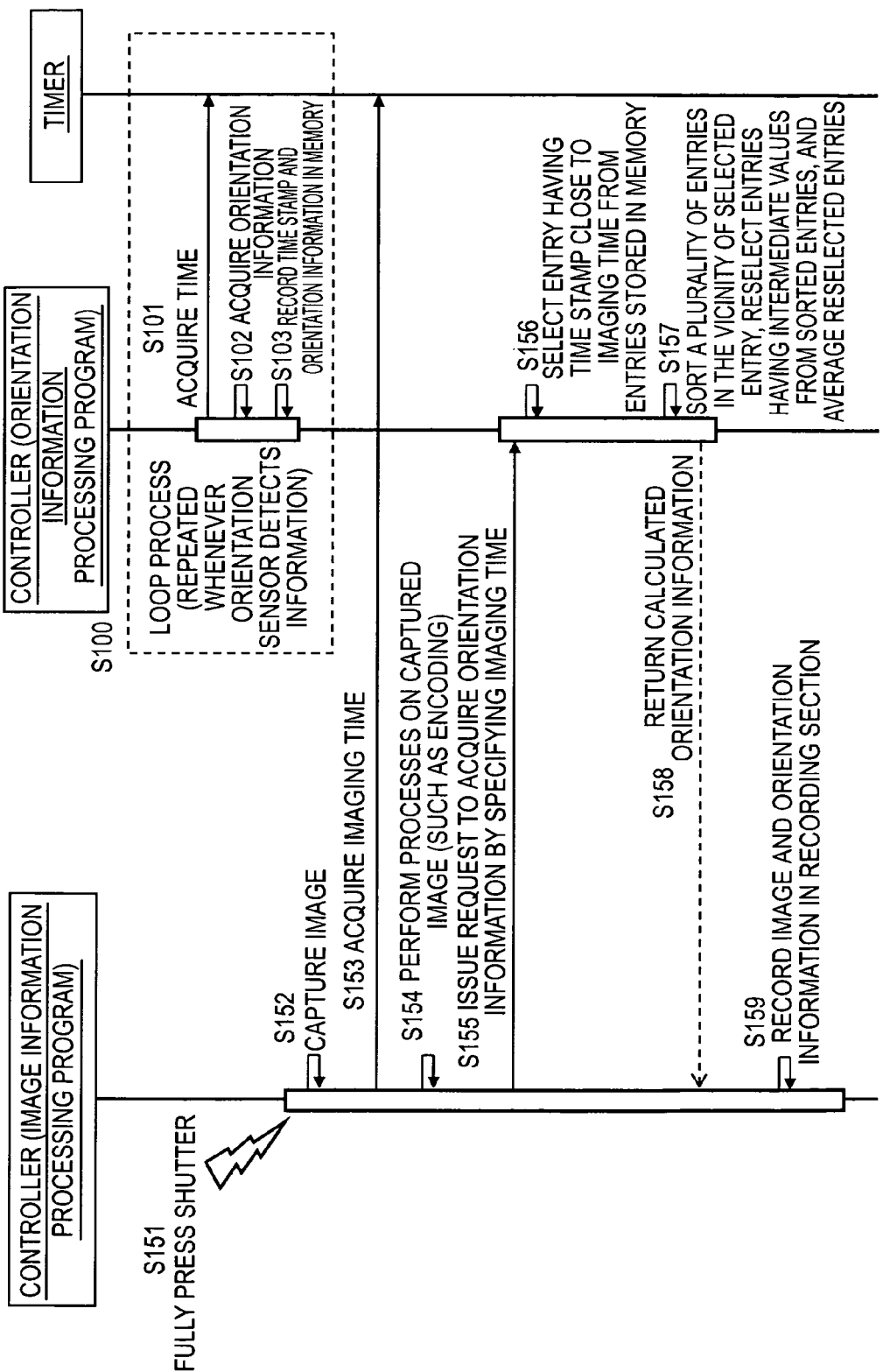
FIG. 11 describes an image capturing and recording sequence in a single image capturing process performed in the imaging apparatus according to the embodiment of the invention.

(a) FIG. 11: Image capturing and recording sequence in a single image capturing process
(b) FIG. 12: Image capturing and recording sequence in a continuous image capturing process
(c) FIG. 13: Images capturing and recording sequence in a panoramic image capturing process The above imaging and recording sequences will be sequentially described below with reference to FIGS. 11 to 13.

(a) Image Capturing and Recording Sequence in a Single Image Capturing Process

The image capturing and recording sequences in a single image capturing process will first be described with reference to FIG. 11.

FIG. 11 shows a data processing sequence in the following components:
the controller (image information processing program),
the controller (orientation information processing program), and
the timer.

As described above, the controller 120 executes the image information processing program, which is primarily responsible for capturing and recording images, and the orientation information processing program, which is primarily responsible for recording in the memory 122 the orientation information calculated based on the information acquired with the orientation sensor 124.

The sequence diagram shown in FIG. 11 shows separate sections where the two respective programs are executed.

The process in step S100 is a loop process performed by the controller 120 in accordance with the orientation information processing program and repeatedly performed whenever the orientation sensor 124 detects information (at sampling time intervals). Specifically, the following processes are repeatedly performed.

Step S101: Acquire time information from the timer 119
Step S102: Acquire information (orientation information) detected with the orientation sensor 124
Step S103: Record data that relate the time stamp to the orientation information (see FIGS. 5A and 5B) in the memory 122

The processes in steps S101 to S103 are repeatedly performed whenever the orientation sensor 124 detects information (at sampling time intervals). For example, when the processes are repeatedly performed at sampling intervals of 100 msec, the latest pieces of orientation information (200 entries, for example) are held in a predetermined area of the memory 122.

The controller 120 performs processes according to the image information processing program independently of the loop process in step S100.

The process in step S152 and those thereafter are those according to the image information processing program. The process in step S152 and those thereafter are performed when the user fully presses the shutter in step S151, that is, when triggered by an image capturing instruction input.

In step S151, when the user fully presses the shutter, an image is taken or captured in step S152.

In step S153, the imaging time is then acquired from the timer.

In step S154, a variety of processes, such as JPEG encoding, are performed on the captured image.

In step S155, a request to acquire orientation information corresponding to the imaging time is issued by providing the orientation information processing program executing section in the controller with the imaging time information acquired in step S153.

The processes in step S155 to S158 correspond to those described with reference to FIGS. 8 to 10.

In step S155, the imaging time information provided to the orientation information processing program executing section in the controller corresponds, for example, to the imaging time information 301 shown in FIG. 8.

The orientation information processing program executing section in the controller selects an entry having a time stamp close to the imaging time from the entries stored in the memory 122 in step S156.

The orientation information processing program executing section in the controller further sorts a plurality of (n) entries (n=8, for example) in the vicinity of the selected entry, reselects ((n/2)=4, for example) intermediate entries from the sorted entries, and averages the values of the orientation information in the reselected entries in step S157.

The orientation information processing program executing section in the controller then provides the image information processing program executing section in the controller 120 with the calculated orientation information in step S158.

The image information processing program executing section in the controller 120 then records the captured image and meta data containing the orientation information in the recording section (recording medium) 117 in step S159.

In the processes described above, the orientation information data to be related to the captured image and then recorded is calculated based on a plurality of pieces of orientation information acquired with the orientation sensor before and after the time at which the image was captured. Further, since the plurality of pieces of selected orientation information are sorted, and orientation information data reselected by removing the data on both ends of the sorted data are averaged, precise orientation information without abnormal values due to disturbance or other factors can be recorded as meta data associated with the image.

(b) Image Capturing and Recording Sequence in a Continuous Image Capturing Process The image capturing and recording sequence in a continuous image capturing process will next be described with reference to FIG. 12.

Figure 12:
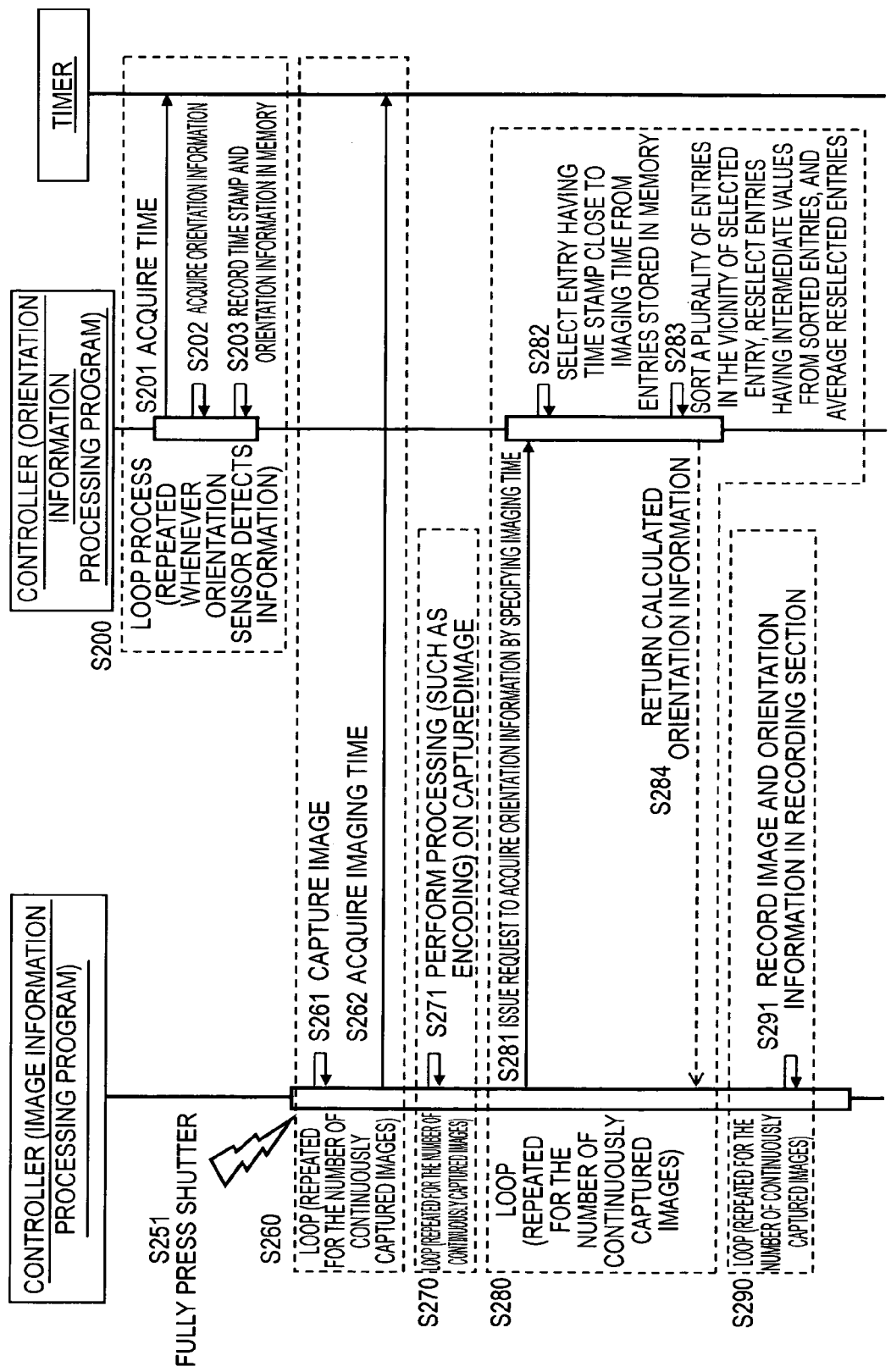
FIG. 12 describes an image capturing and recording sequence in a continuous image capturing process performed in the imaging apparatus according to the embodiment of the invention.

FIG. 12 shows a data processing sequence in the following components:

the controller (image information processing program),
the controller (orientation information processing program), and
the timer, as in FIG. 11.

The process in step S200 is a loop process performed by the controller 120 in accordance with the orientation information processing program and repeatedly performed whenever the orientation sensor 124 detects information (at sampling time intervals). Specifically, the following processes are repeatedly performed.

Step S201: Acquire time information from the timer 119
Step S202: Acquire information (orientation information) detected with the orientation sensor 124
Step S203: Record data that relate the time stamp to the orientation information (see FIGS. 5A and 5B) in the memory 122

The processes in steps S201 to S203 are repeatedly performed whenever the orientation sensor 124 detects information (at sampling time intervals). For example, when the processes are repeatedly performed at sampling intervals of 100 msec, the latest pieces of orientation information (200 entries, for example) are held in a predetermined area of the memory 122.

The controller 120 performs processes according to the image information processing program independently of the loop process in step S200.

The process in step S260 and those thereafter are those according to the image information processing program. The process in step S260 and those thereafter are performed when the user fully presses the shutter in step S251, that is, when triggered by an image capturing instruction input.

The example shown in FIG. 12 shows a continuous image capturing sequence in which the user continuously captures a plurality of images by keeping pressing the shutter.

The processes enclosed with the rectangular dotted lines in steps S260 to S290 shown in FIG. 12 are repeatedly performed for the number of continuously captured images. That is, the processes in each of the steps S260 to S290 are performed as a loop process.

The loop process in step S260 includes processes of capturing an image in step S261 and acquiring the imaging time corresponding to the captured image in step S262. The processes are repeatedly performed for each image captured in the continuous image capturing.

The loop process in step S270 is a process of performing a variety of image processing, such as JPEG encoding, on the captured image. The process is repeatedly performed for each image captured in the continuous image capturing.

The loop process in step S280 is an orientation information acquisition process of relating orientation information to each captured image and recording them.

In step S281, a request to acquire orientation information corresponding to the imaging time is issued by providing the orientation information processing program executing section in the controller with the imaging time information acquired in step S262.

The orientation information processing program executing section in the controller selects an entry having a time stamp close to the imaging time from the entries stored in the memory 122 in step S282.

The orientation information processing program executing section in the controller further sorts a plurality of (n) entries (n=8, for example) in the vicinity of the selected entry, reselects ((n/2)=4, for example) intermediate entries from the sorted entries, and averages the values of the orientation information in the reselected entries in step S283.

The orientation information processing program executing section in the controller then provides the image information processing program executing section in the controller 120 with the calculated orientation information in step S284.

The processes described above are repeatedly performed for each image captured in the continuous image capturing.

The loop process in step S290 is a process of recording the captured images in the recording section (recording medium) 117.

The image information processing program executing section in the controller 120 records the captured images and meta data containing the orientation information in the recording section (recording medium) 117 in step S291.

The process described above is repeatedly performed for each image captured in the continuous image capturing.

In the processes described above, the plurality of pieces of orientation information data to be related to the respective images captured in the continuous image capturing and then recorded in the recording section (recording medium) 117 are calculated based on a plurality of pieces of orientation information acquired with the orientation sensor substantially at the time when the images were captured.

(c) Image Capturing and Recording Sequence in a Panoramic Image Capturing Process The image capturing and recording sequence in a panoramic image capturing process will next be described with reference to FIG. 13.

Figure 13:
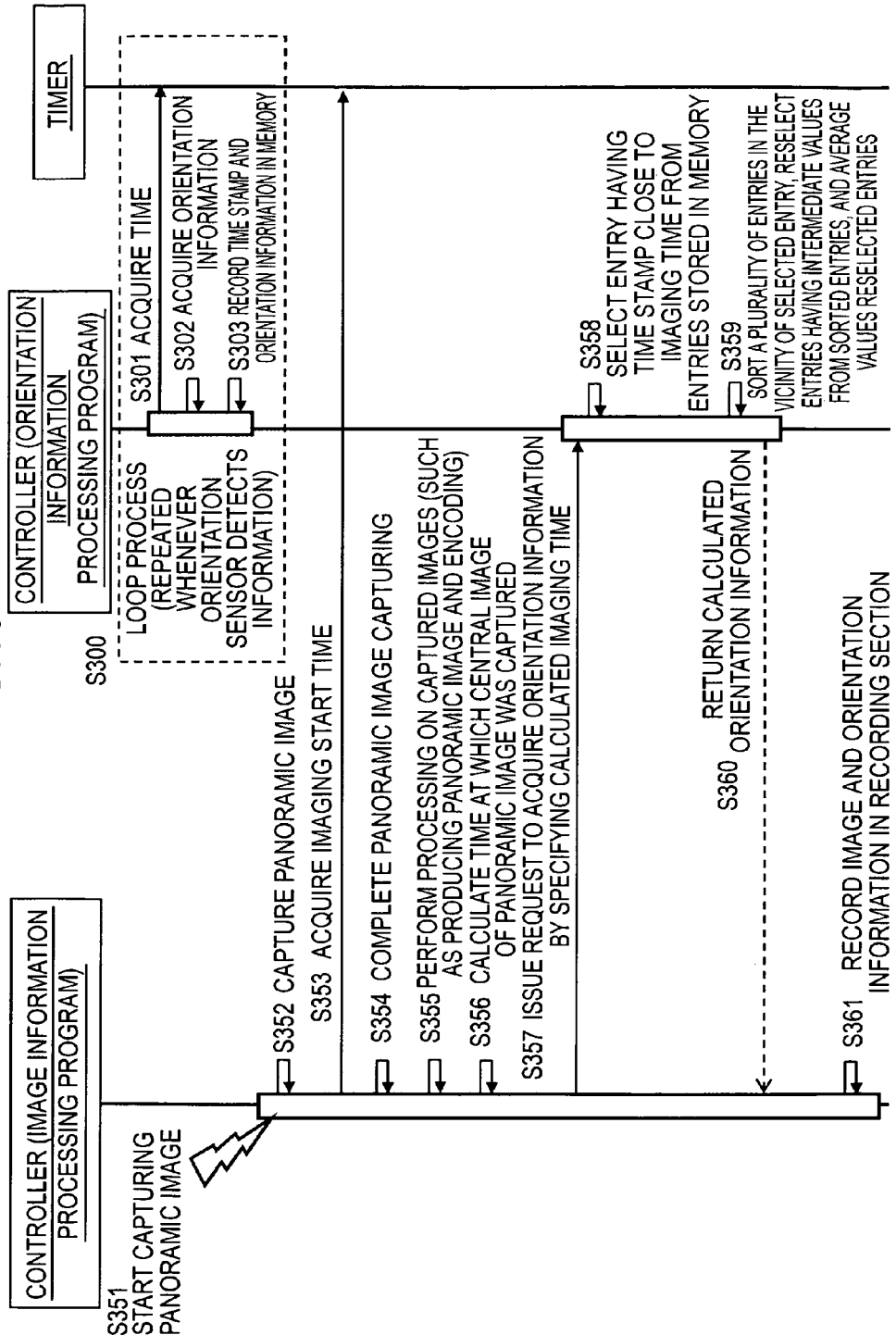
FIG. 13 describes an image capturing and recording sequence in a panoramic image capturing process performed in the imaging apparatus according to the embodiment of the invention.

FIG. 13 shows a data processing sequence in the following components:

the controller (image information processing program),
the controller (orientation information processing program), and
the timer, as in FIGS. 11 and 12.

The process in step S300 is a loop process performed by the controller 120 in accordance with the orientation information processing program and repeatedly performed whenever the orientation sensor 124 detects information (at sampling time intervals). Specifically, the following processes are repeatedly performed.

Step S301: Acquire time information from the timer 119
Step S302: Acquire information (orientation information) detected with the orientation sensor 124

Step S303: Record data that relate the time stamp to the orientation information (see FIGS. 5A and 5B) in the memory 122

The processes in steps S301 to S303 are repeatedly performed whenever the orientation sensor 124 detects information (at sampling time intervals). For example, when the processes are repeatedly performed at sampling intervals of 100 msec, the latest pieces of orientation information (200 entries, for example) are held in a predetermined area of the memory 122.

The controller 120 performs processes according to the image information processing program independently of the loop process in step S300.

The process in step S352 and those afterward are those according to the image information processing program. The process in step S352 and those afterward are performed when the user inputs an instruction as a trigger to start capturing a panoramic image in step S351.

The example shown in FIG. 13 shows a sequence in which the user captures a plurality of images while moving the camera and the signal processor in the imaging apparatus connects the plurality of captured images to produce and record a panoramic image.

The processes described above correspond to those having been described with reference to FIG. 6.

When the user starts capturing a panoramic image in step S351, images are taken or captured in step S352.

The imaging time is then acquired from the timer in step S353.

When the panoramic image capturing process is completed in step S354, a variety of processes are performed on the captured images, such as connecting the plurality of images to produce a panoramic image and JPEG encoding, in step S355.

The time at which the central image of the produced panoramic image was captured is calculated in step S356.

An example of the imaging time calculation will be described with reference to FIG. 14. FIG. 14 shows a panoramic image 500 produced by connecting a plurality of images.

The panoramic image 500 is an image produced by combining a plurality of images f01 to f07 continuously captured at pre-specified imaging time intervals in the panoramic imaging mode.

The imaging time information associated with the first image frame f01 has been acquired in step S353 in the sequence diagram of FIG. 13.

It is assumed that the time at which the frame f01 was captured is [15, 23, 31, 2] (hours, minutes, seconds, hundred milliseconds).

To perform panoramic imaging, the user sets the camera into the panoramic imaging mode and presses the shutter and then moves the camera. In this process, a plurality of images f01 to f07 are captured, as shown in FIG. 14. The signal processor in the camera connects the plurality of images to produce the panoramic image 500.

The orientation information to be recorded as meta data associated with the panoramic image 500 is, for example, the direction in which the central image of the panoramic image 500 was captured. In this case, the position of a point P shown in FIG. 14 is the central position of the panoramic image 500.

The image containing the point P is the frame f04.

The time at which the frame f04 was captured can be calculated from the time at which the first frame was captured. The time intervals at which images are captured in the panoramic mode are specified in advance. The time at which the frame f04 was captured can therefore be calculated in accordance with the following equation, as shown in FIG. 14.

time at which frame $f04$ was captured=[15,23,31,2]+ (imaging interval×3)

For example, when the continuous imaging is performed at intervals of 100 msec, the time at which the frame f04 was captured can be calculated as follows.

time at which frame $f04$ was captured=[15,23,31,2]+ (100 msec×3)=[15,23,31,5](hours, minutes, second, hundred milliseconds)

In step S356 in the sequence diagram shown in FIG. 13, the time at which the central image of the panoramic image was captured is calculated, for example, in the way described above.

In step S357, a request to acquire orientation information corresponding to the imaging time (in the present example, the time at which the central image of the panoramic image was captured) is issued by providing the orientation information processing program executing section in the controller with the imaging time information calculated in step S356.

The processes in steps S357 to S360 correspond to those described with reference to FIGS. 8 to 10.

The orientation information processing program executing section in the controller selects an entry having a time stamp close to the imaging time (in the present example, the time at which the central image of the panoramic image was captured) from the entries stored in the memory 122 in step S358.

The orientation information processing program executing section in the controller further sorts a plurality of (n) entries (n=8, for example) in the vicinity of the selected entry, reselects((n/2)=4, for example) intermediate entries from the sorted entries, and averages the values of the orientation information in the reselected entries in step S359.

The orientation information processing program executing section in the controller then provides the image information processing program executing section in the controller 120 with the calculated orientation information in step S360.

The image information processing program executing section in the controller 120 then records the panoramic image and meta data containing the orientation information (in the present example, the orientation information corresponding to the time at which the central image of the panoramic image was captured) in the recording section (recording medium) 117 in step S361.

In the processes described above, the orientation information data to be related to the panoramic image and then recorded is calculated based on a plurality of pieces of orientation information acquired with the orientation sensor before and after the time at which the central image of the panoramic image, among the plurality of images that form the panoramic image, was captured. Further, since the plurality of pieces of selected orientation information are sorted, and orientation information data reselected by removing the data on both ends of the sorted data are averaged, precise orientation information without abnormal values due to disturbance or other factors can be recorded as meta data associated with the panoramic image.

In the exemplary process described with reference to FIG. 13, only one piece of orientation information associated with a panoramic image is recorded as meta data. Alternatively, imaging direction information associated with each of the images that form the panoramic image may be recorded as meta data in the recording section (recording medium) 117. For example, in the example shown in FIG. 14, the orientation information associated with each of the images f01 to f07, which form the panoramic image 500, is recorded as meta data.

To perform the process described above, the imaging time is calculated for each of the images f01 to f07, which form the panoramic image 500, by using the method described with reference to FIG. 14, and the imaging time information associated with each of the images is provided to the orientation information processing program executing section in the controller.

Thereafter, the orientation information processing program executing section acquires orientation information corresponding to the time at which each of the images was captured in the processes described with reference to FIGS. 8 to 10 and provides the acquired orientation information to the image information processing program executing section in the controller.

The image information processing program executing section records the orientation information as the orientation information associated with each of the images f01 to f07, which form the panoramic image 500, in the recording section (recording medium) 117.

The invention has been described in detail with reference to a specific embodiment. It is, however, obvious that the skilled in the art can modify or replace the embodiment to the extent that the modification or replacement does not depart from the substance of the invention. That is, the invention has been disclosed by way of example and should not be construed in a limited sense. To understand the substance of the invention, the claims should be referred.

The series of processes described in the specification can be performed by hardware, software, or a combination thereof. To perform the processes by software, a program in which the process sequences are recorded is installed in a memory in a computer incorporated into dedicated hardware and then executed, or the program is installed in a general-purpose computer capable of executing a variety of processes and then executed. For example, the program can be recorded on a recording medium in advance. The program can be installed from the recording medium onto a computer, or the program can be received over a LAN (Local Area Network), the Internet, or any other suitable network and installed on a built-in hard disk drive or any other suitable recording medium.

The variety of processes described in the specification may be performed in time series in the order described in the specification or may be performed concurrently or individually as necessary or in accordance with the performance of an apparatus that performs the processes. The word "system" used herein means a logical set of a plurality of devices, and the constituent devices of the "system" are not necessarily incorporated in a single housing.

As described above, according to the configuration of the embodiment of the invention, an entry that relates orientation information calculated by successively receiving a value detected with an orientation sensor that detects orientation representing the direction in which an imaging apparatus is oriented to a time stamp representing the time at which the detected value is inputted from the orientation sensor is successively recorded in a memory. When an image is captured, a plurality of entries having time stamps close to the time at which the image was captured are extracted from the memory, and the plurality of pieces of orientation information in the extracted entries are used to calculate orientation information representing the direction in which the image was captured. The calculated orientation information is then recorded as attribute information associated with the image. In this configuration, the orientation information data to be recorded as the attribute information associated with the image can be calculated based on a plurality of pieces of orientation information acquired by the orientation sensor before and after the time at which the image was captured. Further, since orientation information data reselected by removing data on both ends of the plurality of sorted pieces of orientation information are averaged, precise orientation information without abnormal values due to disturbance or other factors can be recorded as meta data associated with the image.

The present application contains subject matter related to that disclosed in Japanese Priority Patent Application JP 2009-276450 filed in the Japan Patent Office on Dec. 4, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
an orientation sensor that detects orientation representing the direction in which the imaging apparatus is oriented;
a controller that produces data formed of a captured image and attribute information associated with the captured image and records the data in a recording section; and
the recording section that stores a captured image and attribute information,
wherein the controller records a series of entries in a memory, the series of entries relating orientation information calculated by successively receiving a value detected for each entry with the orientation sensor to a time stamp representing the time at which the detected value is inputted from the orientation sensor,
extracts a selected plurality of entries from the series of entries with each one of the selected plurality of entries having time stamps close to the time at which the image was captured from the series of entries recorded in the memory, and
calculates an orientation representing the direction in which the image was captured by using the selected plurality of extracted entries and
wherein the controller extracts the selected plurality of entries having time stamps close to the time at which the image was captured from the series of entries recorded in the memory, reselects a small number of entries having intermediate values of orientation information of the extracted entries, and sets the average of the orientation information of the plurality of reselected entries as the orientation representing the direction in which the image was captured.

2. An imaging apparatus comprising:
an orientation sensor that detects orientation representing the direction in which the imaging apparatus is oriented;
a controller that produces data formed of a captured image and attribute information associated with the captured image and records the data in a recording section; and
the recording section that stores a captured image and attribute information,
wherein the controller successively records an entry in a memory, the entry relating orientation information calculated by successively receiving a value detected with the orientation sensor to a time stamp representing the time at which the detected value is inputted from the orientation sensor, extracts a plurality of entries having time stamps close to the time at which the image was captured from the entries recorded in the memory, and calculates orientation information representing the direction in which the image was captured by using a plurality of pieces of orientation information in the extracted entries, wherein the controller selects a single representative entry having a time stamp closest to the time at which the image was captured from the entries recorded in the memory, selects a specified number of near entries having time stamps close to the time stamp of the representative entry, sorts the plurality of entries formed of the representative entry and the near entries in increasing or decreasing order of magnitude of orientation information, and removes at least the greatest and smallest end entries from the sorted entries, averages the values of orientation information in the remaining intermediate entries, and sets the average as the orientation information representing the direction in which the image was captured.

3. The imaging apparatus according to claim 1, wherein the controller acquires time at which each continuously captured image was captured, extracts the selected plurality of entries having time stamps close to the time at which each continuously captured image was captured from the entries recorded in the memory, and calculates orientation representing the direction in which each continuously captured image was captured by using the orientation information in the extracted entries.

4. The imaging apparatus according to claim 1, wherein the controller extracts the selected plurality of entries having time stamps close to the time at which a central image of a panoramic image produced by combining a plurality of captured images was captured from the entries recorded in the memory and calculates orientation representing the direction in which the panoramic image was captured by using the orientation information in the extracted entries.

5. The imaging apparatus according to claim 4, wherein the controller calculates the time at which the central image of the panoramic image was captured from the time at which an imaging start frame of the panoramic image was captured.

6. A data processing method performed in an imaging apparatus, the method comprising the steps of:

providing an orientation sensor that detects orientation representing the direction in which the imaging apparatus is oriented;

providing a recording section; and providing a controller that produces data formed of a captured image and attribute information associated with the captured image and records the data in the recording section, wherein the recording section stores the captured image and attribute information, wherein the controller:

records a series of entries in a memory, the series of entries relating orientation information calculated by successively receiving a value detected for each entry with the orientation sensor to a time stamp representing the time at which the detected value is inputted from the orientation sensor, extracts a selected plurality of entries from the series of entries with each one of the selected plurality of entries having time stamps close to the time at which the image was captured from the series of entries recorded in the memory, and calculates an orientation representing the direction in which the image was captured by using the selected plurality of extracted entries and wherein the controller extracts the selected plurality of entries having time stamps close to the time at which the image was captured from the series of entries recorded in the memory, reselects a small number of entries having intermediate values of orientation information of the extracted entries, and sets the average of the orientation information of the plurality of reselected entries as the orientation representing the direction in which the image was captured.

7. A non-transitory computer readable program that instructs an imaging apparatus to perform data processing, the image apparatus including an orientation sensor, comprising the steps of:

detecting orientation representing the direction in which the imaging apparatus is oriented;

producing data formed of a captured image and attribute information associated with the captured image and records the data in a recording section;

storing the captured image and attribute information;

recording a series of entries in a memory, the series of entries relating orientation information calculated by successively receiving a value detected for each entry with the orientation sensor to a time stamp representing the time at which the detected value is inputted from the orientation sensor;

extracting a selected plurality of entries from the series of entries with each one of the selected plurality of entries having time stamps close to the time at which the image was captured from the series of entries recorded in the memory;

calculating an orientation representing the direction in which the image was captured by using the selected plurality of extracted entries;

extracting the selected plurality of entries having time stamps close to the time at which the image was captured from the series of entries recorded in the memory;

reselecting a small number of entries having intermediate values of orientation information of the extracted entries; and setting the average of the orientation information of the plurality of reselected entries as the orientation representing the direction in which the image was captured.

* * * * *